(12) United States Patent
Gorokhov

(10) Patent No.: US 8,780,936 B2
(45) Date of Patent: Jul. 15, 2014

(54) SIGNAL ACQUISITION FOR WIRELESS COMMUNICATION SYSTEMS

(75) Inventor: Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 11/751,474

(22) Filed: May 21, 2007

(65) Prior Publication Data

US 2007/0281642 A1    Dec. 6, 2007

Related U.S. Application Data

(60) Provisional application No. 60/802,631, filed on May 22, 2006, provisional application No. 60/815,628, filed on Jun. 21, 2006.

(51) Int. Cl.
*H04J 3/16* (2006.01)
*H04L 27/26* (2006.01)

(52) U.S. Cl.
CPC .................................. *H04L 27/2613* (2013.01)
USPC ........................... 370/468; 370/503; 370/208

(58) Field of Classification Search
USPC ............ 370/503, 329, 338; 455/185.1, 422.1, 455/450
See application file for complete search history.

(56) References Cited

U.S. PATENT DOCUMENTS

| | | | |
|---|---|---|---|
| 5,726,978 A | | 3/1998 | Frodigh et al. |
| 6,052,594 A | * | 4/2000 | Chuang et al. ................ 455/450 |
| 6,515,960 B1 | * | 2/2003 | Usui et al. ..................... 370/203 |
| 6,901,125 B2 | * | 5/2005 | Ghazi-Moghadam et al. ........................... 375/347 |
| 7,012,912 B2 | | 3/2006 | Naguib et al. |
| 7,184,393 B1 | * | 2/2007 | Singh et al. ................... 370/203 |
| 7,436,758 B2 | * | 10/2008 | Suh et al. ....................... 370/203 |
| 7,436,759 B2 | * | 10/2008 | Hayashi et al. ............... 370/208 |
| 7,483,490 B2 | * | 1/2009 | Lee et al. ...................... 375/260 |
| 7,508,842 B2 | * | 3/2009 | Baum et al. ................... 370/468 |
| 7,558,340 B2 | * | 7/2009 | Kim et al. ..................... 375/326 |
| 7,782,750 B2 | * | 8/2010 | Yamaura et al. .............. 370/206 |
| 2002/0095327 A1 | | 7/2002 | Zumel et al. |

(Continued)

FOREIGN PATENT DOCUMENTS

| | | |
|---|---|---|
| JP | 2002111631 A | 4/2002 |
| JP | 2003244763 A | 8/2003 |

(Continued)

OTHER PUBLICATIONS

International Preliminary Report on Patentability—PCT/US07/069469, The International Bureau of WIPO—Geneva, Switzerland, Nov. 27, 2008.

(Continued)

*Primary Examiner* — Rasheed Gidado
(74) *Attorney, Agent, or Firm* — Peng Zhu

(57) ABSTRACT

Systems and methodologies are described that facilitate signal acquisition in a wireless communication system on one or more frequency carriers corresponding to a portion of the deployed bandwidth in a wireless communication environment. By communicating using carriers that include only a portion of the total system bandwidth, channels used for communication in a carrier may be less dispersive than channels used for communication across the entire bandwidth. Thus, the amount of transmit power required for devices in the system may be reduced. Further, the carriers may be divided from the deployed system bandwidth such that each carrier is sufficiently large to minimize the effects of fading on component frequency response, thereby further optimizing system performance.

54 Claims, 18 Drawing Sheets

(56) References Cited

U.S. PATENT DOCUMENTS

| | | | |
|---|---|---|---|
| 2003/0072255 A1* | 4/2003 | Ma et al. | 370/208 |
| 2003/0152178 A1* | 8/2003 | Tanno et al. | 375/354 |
| 2003/0174643 A1* | 9/2003 | Ro et al. | 370/210 |
| 2004/0218523 A1* | 11/2004 | Varshney et al. | 370/208 |
| 2004/0246998 A1* | 12/2004 | Ma et al. | 370/527 |
| 2004/0257979 A1* | 12/2004 | Ro et al. | 370/208 |
| 2005/0002369 A1* | 1/2005 | Ro et al. | 370/342 |
| 2005/0063298 A1* | 3/2005 | Ling et al. | 370/208 |
| 2005/0094613 A1* | 5/2005 | Cho et al. | 370/343 |
| 2005/0163238 A1* | 7/2005 | Fujii | 375/260 |
| 2005/0174929 A1* | 8/2005 | Hayashi et al. | 370/208 |
| 2005/0207367 A1* | 9/2005 | Onggosanusi et al. | 370/315 |
| 2005/0249180 A1* | 11/2005 | Murakami et al. | 370/343 |
| 2006/0013338 A1* | 1/2006 | Gore et al. | 375/324 |
| 2006/0097915 A1* | 5/2006 | Martin et al. | 342/357.15 |
| 2006/0114812 A1* | 6/2006 | Kim et al. | 370/206 |
| 2006/0146867 A1* | 7/2006 | Lee et al. | 370/465 |
| 2006/0209669 A1 | 9/2006 | Nishio | |
| 2006/0215603 A1 | 9/2006 | Nishio et al. | |
| 2006/0286974 A1 | 12/2006 | Gore et al. | |
| 2007/0022441 A1* | 1/2007 | Nystrom et al. | 725/62 |
| 2007/0047665 A1* | 3/2007 | Friend | 375/260 |
| 2007/0087749 A1* | 4/2007 | Ionescu et al. | 455/436 |
| 2007/0097910 A1 | 5/2007 | Ji et al. | |
| 2007/0254594 A1* | 11/2007 | Jansen | 455/67.13 |
| 2009/0147868 A1* | 6/2009 | Ihm et al. | 375/260 |

FOREIGN PATENT DOCUMENTS

| | | |
|---|---|---|
| JP | 2004312291 A | 11/2004 |
| RU | 2216103 C2 | 11/2003 |
| WO | WO2004021616 A1 | 3/2004 |
| WO | WO2005020488 A1 | 3/2005 |
| WO | 2005043791 | 5/2005 |
| WO | 2005109917 | 11/2005 |
| WO | WO2006112292 A1 | 10/2006 |

OTHER PUBLICATIONS

Sharma, D. et al.: "Fast Cell Synchronization for Beyond 3G OFDMA Based System"; Wireless and Optical Communications Networks, 2006 IFIP International Conference on Bangalore, India Apr. 11-13, 2006, Piscataway, NJ. USA, IEEE, Apr. 11, 2006, pp. 1-5, XP010933856 ISBN: 1-4244-0340-5.
Pandya, R.: "Mobile and Personal Communication Services and Systems" 2000, IEEE Press, pp. 15-18, XP002456184.
3GPP TSG RAN WG1 #45 Meeing, TD Tech, R1-061160; "Cell Search and Identification of Cell ID for EUTRA TDD," May 12, 2006, pp. 1-6, XP002456183.
International Search Report—PCT/US07/069469—International Search Authority, European Patent Office, Feb. 6, 2008.
Written Opinion—PCT/US07/069469—International Search Authority, European Patent Office—Feb. 6, 2008.
Taiwanese Search report—096118264—TIPO—Dec. 10, 2010.
Ericsson et al, UE Capability on Supportable Bandwidths, TSG RAN WG1 #43 R1-051309, 3GPP, Nov. 11, 2005.
NTT DOCOMO: "Channel-dependent packet scheduling for Single-Carrier FDMA in evolved UTRA Uplink" TSG-RAN WG1 #43, (Online) Nov. 7, 2005, pp. 1-8, XP002465080.
European Search Report—EP09156760—Search Authority—Munich—Mar. 8, 2012.
European Search Report—EP10189499—Search Authority—Munich—Mar. 9, 2012.
Samsung, "Cell search procedure and channel structure", 3GPP TSG-RAN WG1#44b R1-060812 , Mar. 31, 2006. Internet <URL:http://www.3gpp.org/ftp/tsg_ran/WG1_RL1/TSGR1_44bis/Docs/R1-060812.zip>.
ZTE, "Comparing of Two Downlink Synchronization Channel Schemes for E-UTRA", 3GPP TSG-RAN WG1#43 R1-051357, Nov. 11, 2005. Internet <URL:http://www.3gpp.org/ftp/tsg_ran/WG1_RL1/TSGR1_43/Docs/R1-051357.zip>.
Attar, et al.: "Evolution of cdma2000 Cellular Networks: Multicarrier EV-DO," IEEE Communications Magazine, vol. 44, No. 3, pp. 46-53, XP-002415258, ISSN: 0163-6804, Mar. 2006.
Huawei: "Control channel design in frequency domain", 3GPP R1-061402, May 12, 2006.
NTT DOCOMO: Channel-Dependent Packet Scheduling fir Single-Carrier FDMA in Evolved UTRA Uplink, 3GPP R1-051390, Nov. 11, 2005.
Qualcomm Europe: "DL Acquisition for E-UTRA", 3GPP R1-060465, Feb. 17, 2006.
Qualcomm Europe: "DL PHY channels: Channel multiplexing", 3GPP R1-060462, Feb. 17, 2006.
Qualcomm Europe: "DL PHY channels: Overall structure", 3GPP R1-060461, Feb. 17, 2006.
Qualcomm Europe: "Link analysis of DL overhead", 3GPP R1-061509, May 12, 2006.
Texas Instruments: "Aspects and Design of DL Sync channel (SCH) for E-UTRA", 3GPP R1-060860, Mar. 31, 2006.

* cited by examiner

SIGNAL ACQUISITION FOR WIRELESS COMMUNICATION SYSTEMS

CROSS-REFERENCE

This application claims the benefit of U.S. Provisional Application Ser. No. 60/802,631, filed May 22, 2006, entitled "SIGNAL ACQUISITION FOR WIRELESS COMMUNICATION SYSTEMS," the entirety of which is incorporated herein by reference. Further, this application claims the benefit of U.S. Provisional Application Ser. No. 60/815,628, filed Jun. 21, 2006, entitled "SIGNAL ACQUISITION FOR WIRELESS COMMUNICATION SYSTEMS," the entirety of which is also incorporated herein by reference.

BACKGROUND

I. Field

The present disclosure relates generally to wireless communication, and more specifically to techniques for signal acquisition in a wireless communication system.

II. Background

Wireless communication systems have become a prevalent means by which a majority of people worldwide communicate. In addition, wireless communication devices such as cellular telephones have become smaller and more powerful in order to meet consumer needs and to improve portability and convenience. This increase in processing power in mobile devices has led to an increase in the demanded performance of wireless network transmission systems. However, such systems typically are not as easily updated as the cellular devices that communicate thereover. As mobile device capabilities expand, it can be difficult to maintain an older wireless network system in a manner that facilitates fully exploiting new and improved wireless device capabilities.

For example, wireless communication systems typically generate transmission resources in the form of channels from a system deployment bandwidth. When a large bandwidth is deployed in a network, as is the case in many networks that support newer, more powerful mobile devices, it has traditionally been difficult to enforce adequate system performance, such as signal acquisition performance, in a wireless communication system. For example, the frequency response of components in a system with a large bandwidth may vary significantly across the bandwidth due to fading and/or other factors. Typically, this variance in frequency response requires the generation of wider channels. However, wider channels often become dispersive, which may significantly increase the amount of transmit power necessary for communication on a given channel.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by dividing the bandwidth deployed for a wireless communication system into a plurality of frequency carriers. Each device in the system may then perform signal acquisition or otherwise communicate using a portion of the deployed bandwidth corresponding to one or more carriers. By communicating using carriers that include only a portion of the total system bandwidth, channels used for communication in a carrier may be less dispersive than channels used for communication across the entire bandwidth. Thus, the amount of transmit power required for devices in the system may be reduced. Further, the carriers may be divided from the deployed system bandwidth such that each carrier is sufficiently large to minimize the effects of fading on component frequency response, thereby further optimizing system performance.

According to an aspect, a method for generating and transmitting acquisition information in a wireless communication system is provided herein. The method may comprise generating a plurality of symbols of an acquisition signal. In addition, the method may include assigning transmission of the acquisition signal to a number of subcarriers that is equal to all or less than all of a bandwidth of one or more carriers.

Another aspect relates to a wireless communications apparatus that may include a memory that stores data relating to an acquisition signal and a plurality of carriers corresponding to substantially non-overlapping portions of available system bandwidth. The wireless communications apparatus may further include a processor configured to assign transmission of the acquisition signal to all or part of one or more of the plurality of carriers.

Yet another aspect relates to an apparatus that facilitates signal acquisition in a wireless communication network. The apparatus may comprise means for dividing available system bandwidth into a plurality of carriers. Further, the apparatus may include means for transmitting acquisition information to the terminal using one or more of the plurality of carriers.

Still another aspect relates to a computer-readable medium having stored thereon computer-executable instructions for generating and transmitting information for acquisition in a wireless communication environment. The instructions may comprise dividing available system bandwidth into a plurality of carriers, each of the plurality of carriers comprising a plurality of subcarriers and a bandwidth that is equal to a portion of the system bandwidth. In addition, the instructions may include generating a plurality of symbols for an acquisition signal. Further, the instructions may include transmitting the acquisition signal on a number of one or more subcarriers in at least one of the plurality of carriers.

According to another aspect, a processor is provided herein that may execute computer-executable instructions for transmitting acquisition information. The instructions may comprise generating a first acquisition signal and a second acquisition signal. In addition, the instructions may comprise transmitting the first acquisition signal to a first access terminal on a carrier comprising a portion of available system bandwidth. Further, the instructions may include transmitting the second acquisition signal to a second access terminal on a carrier comprising a portion of available system bandwidth.

In accordance with yet another aspect, a method for acquiring information for communication in a wireless communication system is provided herein. The method may comprise attempting to detect an acquisition signal over at least two carriers, each carrier comprising one or more subcarriers and a portion of available system bandwidth. Additionally, the method may include determining a future carrier over which information will be communicated by an access point based at least in part on a carrier over which the acquisition signal is detected.

Another aspect relates to a wireless communications apparatus that may comprise a memory that stores data relating to a plurality of carriers. The wireless communications apparatus may also include a processor configured to attempt detection of an acquisition signal over the plurality of carriers and to determine a future carrier of which information will be communicated by a sector based at least in part on a carrier over which the acquisition signal is detected.

Yet another aspect relates to an apparatus that facilitates signal acquisition in a wireless communication network, which may comprise means for detecting an acquisition signal over system bandwidth corresponding to a plurality of carriers. The apparatus may further comprise means for determining a carrier for communication with an access point based at least in part on a carrier over which the acquisition signal is detected.

Still another aspect relates to a computer-readable medium having stored thereon computer-executable instructions for acquiring information for communication in a wireless communication environment. The instructions may include detecting an acquisition signal transmitted by an access point across bandwidth equal to at least two carriers. In addition, the instructions may include determining a carrier for communication with the access point based at least in part on the acquisition signal.

In accordance with another aspect, a processor is described herein that may execute computer-executable instructions for communicating in a wireless communication system. The instructions may comprise receiving an acquisition signal transmitted from a sector of the wireless communication system. In addition, the instructions may comprise determining one or more carriers for communication with the sector based at least in part on a carrier over which the acquisition signal was received. Further, the instructions may comprise communicating with the sector at least in part by using the one or more carriers determined for communication.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
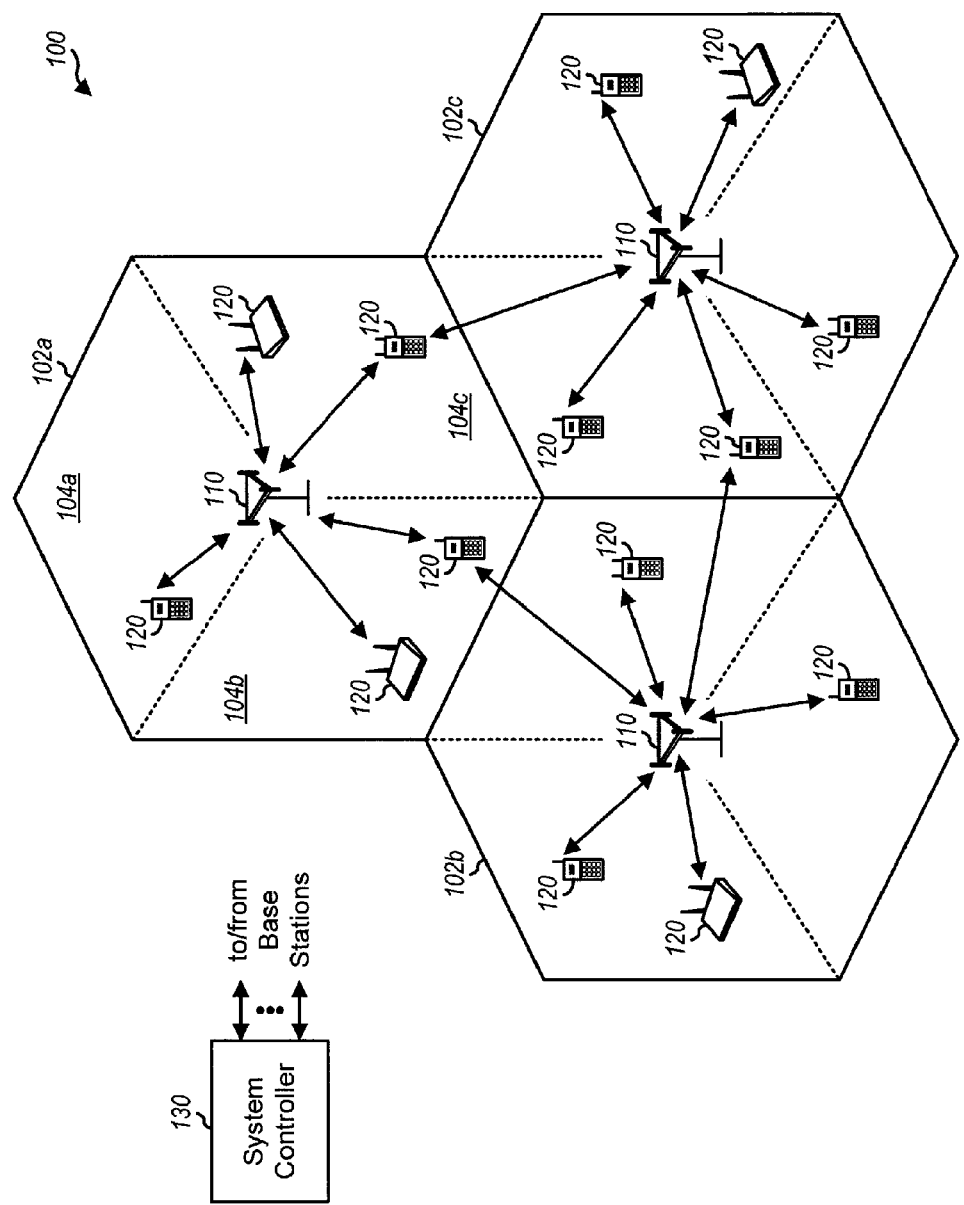
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 may be partitioned into multiple smaller areas (e.g., areas 104*a*, 104*b*, and 104*c*). Each of the smaller areas 104*a*, 104*b*, and 104*c* may be served by a respective base transceiver subsystem (BTS, not shown). As used herein and generally in the art, the term "sector" can refer to a BTS and/or its coverage area depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102*a* may have a first antenna group corresponding to sector 104*a*, a second antenna group corresponding to sector 104*b*, and a third antenna group corresponding to sector 104*c*. However, it should be appreciated that the various aspects disclosed herein may be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein may refer both to a station that serves a sector as well as a station that serves a cell.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal 120 may be a wireless device, a cellular phone, a personal digital assistant (PDA), a wireless modem, a handheld device, or another appropriate device. Further, a terminal 120 may communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In one example, system controller 130 can additionally contain one or more connections to multiple networks. These networks may include the Internet, other packet based networks, and/or circuit switched voice networks that may provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler may reside in each individual cell 102, each sector 104, or a combination thereof.

In accordance with one aspect, each sector 104 can operate utilizing one or more of a plurality of carriers. In one example, each carrier is a portion of a larger bandwidth in which system 100 can operate. Alternatively, each carrier may be a portion of system bandwidth available for communication. In accordance with another aspect, a single sector 104 may utilize one or more carriers and may have multiple terminals 120 scheduled on each of the carriers utilized by the sector 104 during any given time interval (e.g., a physical layer frame or superframe).

Further, one or more terminals 120 can be scheduled on multiple carriers simultaneously according to the capabilities of each terminal 120. In one example, these capabilities can be included in pre-negotiated session information or be part of session information generated when a terminal 120 attempts to acquire communication. The session information can comprise a session identification token, which may be generated by querying a terminal 120 or determining the capabilities of a terminal 120 through its transmissions. Alternatively, these capabilities may be part of identification information transmitted by a terminal 120. Capabilities of a terminal 120 may also be established according to any other suitable approach.

In accordance with another aspect, acquisition signals may be provided on only one carrier for a given superframe. Further, the acquisition signals may be provided in a superframe preamble. The carrier used for the acquisition signals may vary with time based on, for example, a hop sequence. By reducing the acquisition signals to one carrier, the dispersion effect encountered for acquisition by terminals 120 may be reduced. Further, in an example where each base station 110 can have a different hop sequence or pattern, the likelihood of collision of the acquisition signals may be decreased, thus improving acquisition capability by terminals 120.

Additionally, it should be appreciated that while system 100 is illustrated as including physical sectors 104, other approaches may be utilized. For example, multiple fixed "beams" may be utilized that may each cover different areas of a cell 102 in frequency space in lieu of, or in combination with, physical sectors 104. Such an approach is depicted and disclosed in co-pending U.S. patent application Ser. No. 11/260,895, filed Oct. 27, 2005, entitled "ADAPTIVE SECTORIZATION IN CELLULAR SYSTEMS," the entirety of which is incorporated herein by reference.

Figure 2:
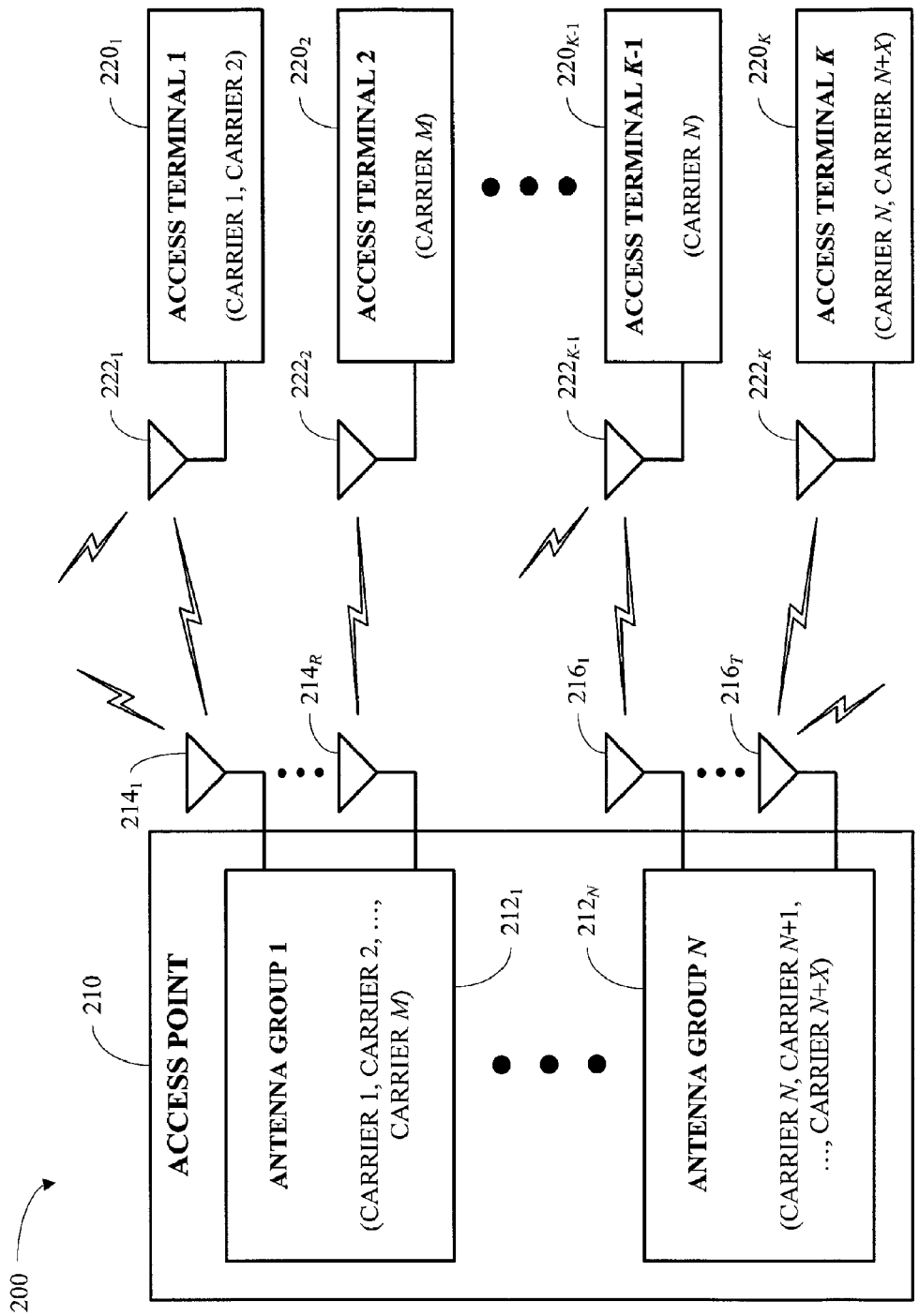
FIG. 2 is a block diagram of a system that facilitates signal acquisition in a wireless communication environment in accordance with various aspects described herein.

FIG. 2 is a block diagram of a system 200 that facilitates signal acquisition in a wireless communication environment in accordance with various aspects described herein. In one example, system 200 includes an access point 210 and a plurality of access terminals 220. Although not illustrated in system 200 for brevity, system 200 may also include a plurality of access points 210. In accordance with one aspect, access point 210 can include one or more antenna groups 212, each of which may comprise one or more antennas 214 and/or 216 that may communicate with one or more access terminals 220. For example, as illustrated in system 200, antenna group $212_1$ comprises R antennas 214 and antenna group $212_N$ comprises T antennas 216. In one example, access point 210 can serve a cell (e.g., a cell 102) and each antenna group 212 in access point 210 can serve a sector (e.g., a sector 104) within the cell.

In accordance with another aspect, bandwidth available for communication on system 200 can be divided into a plurality of carriers. Each access point 210 and/or each antenna group 212 in an access point 210 can then utilize one or more of the carriers to communicate with access terminals 220. This communication may include, for example, transmission of one or more acquisition pilots and/or broadcast channels to access terminals 220. Each carrier can be utilized at each access point 210, or alternatively each access point 210 can use a subset of the available carriers. Similarly, each antenna group 212 in an access point 210 can use all of the carriers provided by the access point 210 or a subset of those carriers. The carriers utilized in system 200 can be unique for each access point 210 and/or antenna group 212 within an access point 210, or alternatively more than one access point 210 and/or antenna group 212 may use a particular carrier.

In accordance with a further aspect, acquisition signals, broadcast channels, and/or other communications transmitted by each antenna 214 and 216 in access point 210 can be received by one or more access terminals 220 via a corresponding antenna 222. Although only one antenna 222 is illustrated at each access terminal 220, it should be appreciated that each access terminal 220 may have any number of antennas 222. Further, each antenna 222 at an access terminal 220 may be used for communication with one or more access points 210, antenna groups 212 within an access point 210, and/or other access terminals 220. In one example, each access terminal 220 can receive an acquisition signal from an access point 210 on one of the carriers utilized by system 200. The carrier on which the acquisition signal is received by access terminals 220 may be predetermined, or alternatively one or more access terminals 220 may monitor across the entire available bandwidth of system 200 for an acquisition signal.

In another example, each access terminal 220 can receive an assignment for one or more carriers to be used for communication with an access point 210 or an antenna group 212 within an access point 210. By way of non-limiting example, assignments may be made such that access terminals 220 with limited ability to communicate across a large band may be assigned to a single carrier, while access terminals 220 with a greater ability to communicate across a larger band may be assigned to a plurality of carriers. In accordance with one aspect, the assignment may include the carrier on which the acquisition signal was received by each access terminal 220 and/or one or more other carriers. Further, each carrier may be simultaneously utilized by one or more access terminals 220 simultaneously. For example, as illustrated by system 200, access terminal $220_{K-1}$ may be assigned to carrier N and access terminal $220_K$ may also be assigned to carrier N and additionally assigned to a second carrier N+R.

In accordance with one aspect, by communicating over carriers that are collectively smaller than the total bandwidth of system 200, the effects of channel dispersion in system 200 can be reduced. This can in turn reduce the transmit power required for each access point 210 and/or access terminal 220, thereby increasing the efficiency of each access point 210 and/or conserving the battery life of each access terminal 220. Further, the system bandwidth may be divided such that each carrier is sufficiently large to minimize the effects of fading and other similar factors on system performance. By way of a specific, non-limiting example, system 200 may utilize a 20 MHz bandwidth and each carrier may comprise 5 MHz of the total bandwidth. It should be appreciated, however, that this example merely illustrates one possible system bandwidth and carrier division that could be employed in system 200 and that any other suitable system bandwidth and/or carrier division could also be employed.

Figure 3A:
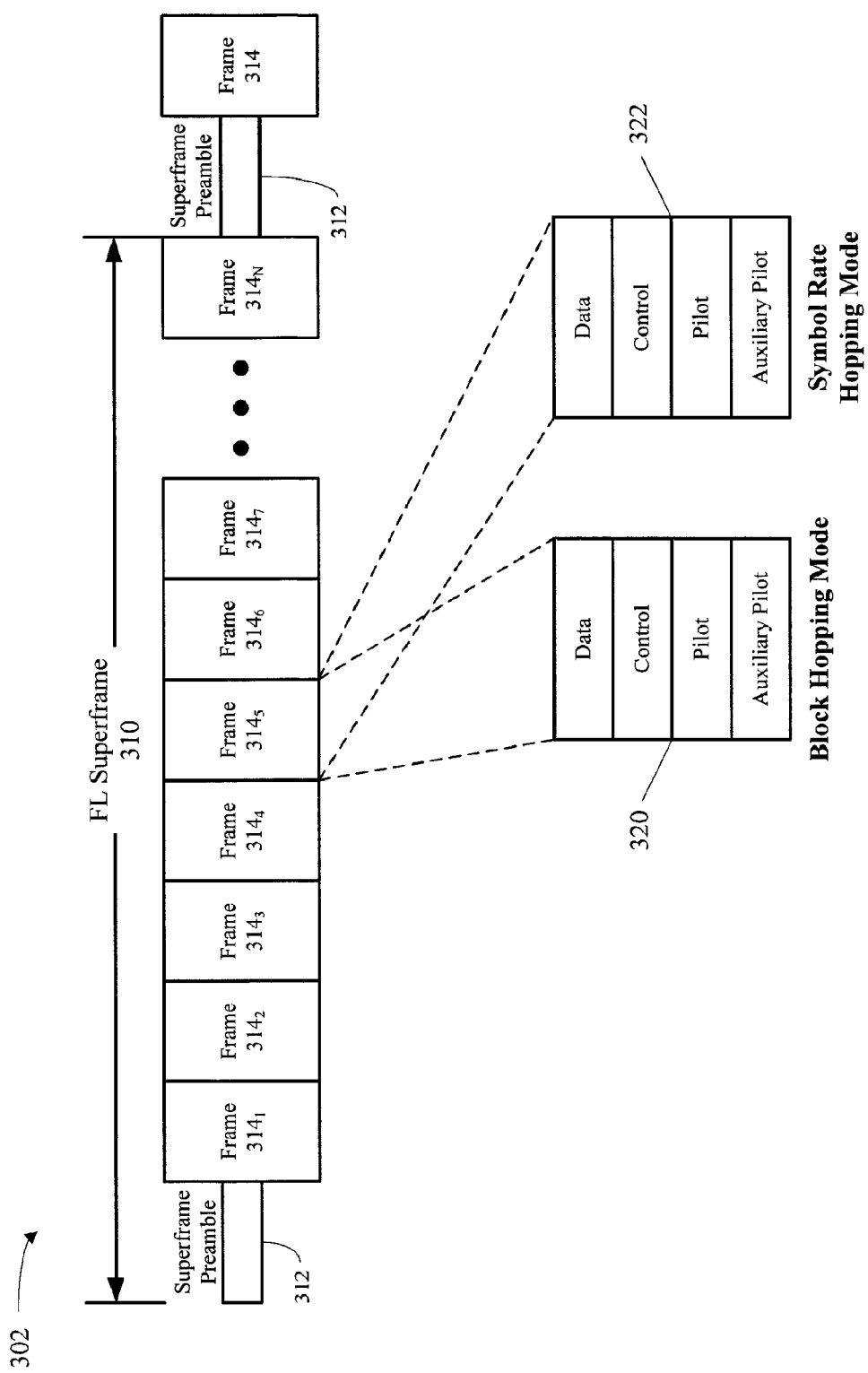
FIGS. 3A-3B illustrate example superframe structures for a multiple access wireless communication system in accordance with various aspects.

FIG. 3A illustrates an example superframe structure 302 for a multiple access wireless communication system (e.g., system 100) utilizing frequency division duplexing (FDD). In one example, a superframe preamble 312 is transmitted at the beginning of each superframe 310. A superframe preamble 312 may span one carrier or a portion thereof. Further, each superframe preamble 312 may hop for each superframe 310, a predetermined number of superframes 310, a fixed time duration, or another suitable interval. Further, each superframe preamble 312 may hop according to a hop sequence or pattern, which may be determined based on an identification for an access point (e.g., an access point 110). For example, an access point identification may be a pseudo-noise (PN) sequence, from which an access terminal (e.g., a terminal 120) may determine the hop pattern or sequence for the superframe 310. The access terminal may then determine the carrier to be associated with the superframe preamble 312 in the next superframe 310 based on the access point identification and the carrier associated with the superframe preamble 312 in the last superframe 310. In addition, while superframe 310 is illustrated as a forward link (FL) superframe, it should be appreciated that superframe 310 could alternatively be a reverse link superframe.

In one example, a transmission can be divided into units of superframes 310, each consisting of a superframe preamble 312 followed by a series of frames 314. In FDD structure 302, a reverse link transmission and a forward link transmission may occupy different frequencies such that transmissions on the forward and reverse links are substantially non-overlapping on any given frequency subcarrier. In another example, superframe preamble 312 can contain a pilot channel that can include pilots that may be used for channel estimation by access terminals. Further, superframe preamble 312 can include a broadcast channel that includes configuration information that an access terminal (e.g., a terminal 120) may utilize to demodulate information contained in a forward link frame 314. Additionally and/or alternatively, superframe preamble 312 may include acquisition information such as timing and other information sufficient for an access terminal to communicate, power control information, and/or offset information. Thus, superframe preamble 312 may contain one or more of a common pilot channel, a broadcast channel, an acquisition pilot channel, an other sector interference channel, and/or other appropriate channels.

In another example, superframe preamble 312 may include a pilot channel for synchronization and sector ID acquisition, a first broadcast channel that carries static deployment parameters and system time, and/or a second broadcast channel that carries quasi-static sector parameters. In one example, the quasi-static sector parameters carried by the second broadcast channel can be related to forward link configuration in odd superframes 310 and a quick paging channel in even superframes 310. Additionally, the parameters may include auxiliary dynamic parameters such as sector loading. In another example, the first broadcast channel can be coded over multiple superframes 310 and the second broadcast channel can be coded over a single superframe 310.

In accordance with one aspect, superframe preamble 312 may comprise one or more symbols, such as OFDM symbols, and one or more symbols in superframe preamble 312 may hop according to a hop sequence or pattern that is coordinated between sectors (e.g., sectors 104). For example, a hop sequence or scheduling scheme can be used that is common to a set of sectors or all of the sectors of a network. In accordance with another aspect, a first broadcast channel, a second broadcast channel, or both the first and second broadcast channels may hop in a given superframe 310.

In another example, the total bandwidth for the system may be divided into one or more carriers, and each carrier in turn may be divided into a plurality of frequency subcarriers or tones. For each superframe 310 at each sector, one of the carriers may then be used to populate the superframe preamble 312 corresponding to each respective superframe 310. Further, a re-use factor K may then applied to the tones that make up the superframe preamble 312. Thus, for a given superframe 310 (herein denoted as SFidx) at a given sector (herein denoted as PilotPN), broadcast channels, other channels, and/or symbols of the superframe preamble 312 for the superframe 310 provided by a carrier with index k where $0 \leq k \leq K$ may be defined as follows:

$$k = \text{PilotPhase} \bmod K;$$

$$\text{PilotPhase} = (\text{Pilot}PN + SFidx) \bmod N; \quad (1)$$

where PilotPN and PilotPhase can be an identity scrambling indices for a given sector or another suitable factor used to identify a given sector and N corresponds to a predetermined maximum value for PilotPhase. In one example, PilotPN and PilotPhase may be utilized to scramble one or more pilot signals transmitted by a given sector in a superframe preamble 312 to allow identification of a sector by an access terminal.

In accordance with another aspect, paging may not be performed in a superframe preamble 312 if multiple sectors utilize a shared spectrum for the superframe preamble 312. For example, paging may not be performed if multiple sectors share subcarriers that comprise a superframe preamble 312. Further, where PilotPN1 and PilotPN2 are the respective identifications of different sectors, hopping may be kept orthogonal by observing the following equation:

$$(\text{Pilot}PN_1 - \text{Pilot}PN_2) \bmod K \neq 0. \quad (2)$$

Thus, different sectors in the system, i.e., sectors with different values of PilotPN mod K, will utilize different carriers. By way of specific, non-limiting example, 7-sector frequency re-use may then be achieved for the system based on Equation (1) by selecting a re-use factor of K=8 and dividing the available system bandwidth into eight subsets. Frequency planning may then be coordinated with the planning of PilotPN indices such that the subset of bandwidth satisfying PilotPN mod 7=0 is not assigned and 7-sector frequency re-use planning is conducted with the remaining 7 subsets. In an alternative non-limiting example, 7-sector frequency re-use can be accomplished in accordance with Equation (1) by selecting a re-use factor of K=7 and dividing the available system bandwidth into seven subsets, each of which may then be assigned. In this example, the value of N corresponding to the maximum value of PilotPhase may be selected to be a multiple of 7. In one specific, non-limiting example, N may be chosen to be 511.

In addition, superframe preamble 312 can be followed by a sequence of frames 314. Each frame 314 can consist of a uniform or non-uniform number of OFDM symbols and a uniform or non-uniform number of subcarriers that may simultaneously be utilized for transmission. By way of a specific, non-limiting example, a superframe preamble 312 can be composed of 32 OFDM symbols and followed by 48 frames 314, each frame 314 composed of 8 OFDM symbols. In an alternative non-limiting example, each superframe preamble 312 can be composed of 16 frames and followed by 48 frames 314 that are 8 OFDM symbols in length. Further, each frame 314 may operate according to a symbol rate hopping mode 322, wherein one or more non-contiguous OFDM symbols are assigned to a terminal on a forward link or reverse link. Alternatively, each frame 314 may operate according to a block hopping mode 320, wherein terminals may hop within a block of OFDM symbols. In both block hopping mode 320 and symbol rate hopping mode 322, blocks or OFDM symbols may or may not hop between frames 314.

In accordance with another aspect, superframe 310 may not utilize a superframe preamble 312. In one alternative, a preamble may be provided for one or more frames 314 that include equivalent information to superframe preamble 312. In another alternative, a broadcast control channel may be utilized to contain some or all of the information of superframe preamble 312. Other information may additionally be contained in a preamble or control channel of a frame 314.

Figure 3B:
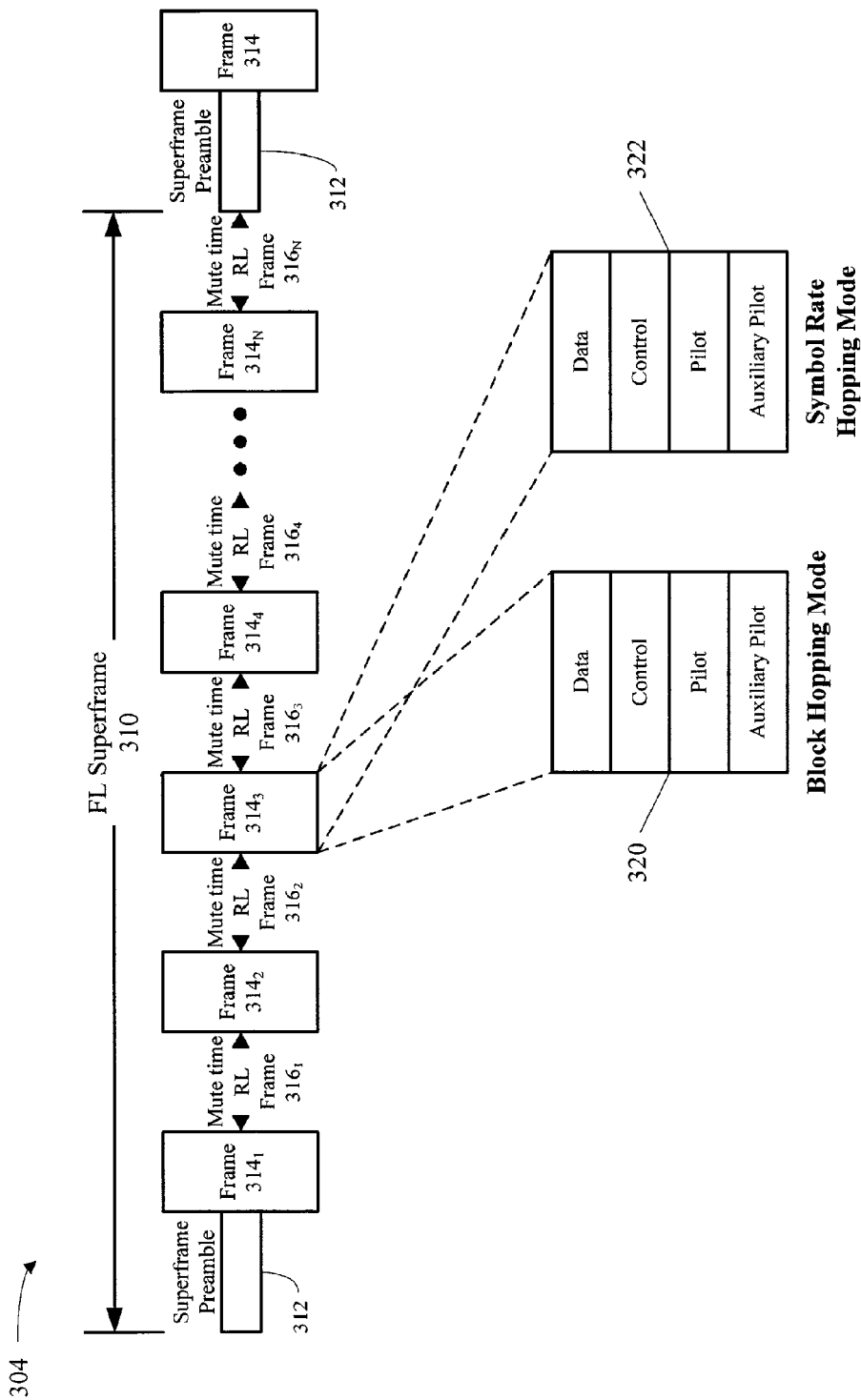

FIG. 3B illustrates an example superframe structure 304 for a multiple access wireless communication system utilizing time division duplexing (TDD). In one example, a superframe preamble 312 can be transmitted at the beginning of each superframe 310 that is substantially similar in construction and performance to superframe preamble 312 in FDD structure 302. In accordance with one aspect, each superframe preamble 312 in TDD structure 304 can be followed by a sequence of forward link frames 314 and reverse link frames 316. Forward link frames 314 and reverse link frames 316 may be divided in time such that a predetermined number of forward link frames 314 are continuously transmitted prior to allowing transmission of a predetermined number of reverse link frames 316. As illustrated in superframe structure 304, a forward link superframe 310 will experience mute time during the transmission of one or more reverse link frames 316. Similarly, it should be appreciated that a reverse link superframe would experience mute time during the transmission of forward link frames 314. Further, it should be appreciated that any number of forward link frames 314 and any number of reverse link frames 316 may be continuously transmitted in superframe structure 304 and that said numbers of frames may vary within a given superframe or between superframes.

Further, each forward link frame 314 can consist of a uniform or non-uniform number of OFDM symbols and a uniform or non-uniform number of subcarriers that may simultaneously be utilized for transmission in a similar manner to frames 314 in FDD structure 302. In one example, each forward link frame 314 may operate according to a symbol rate hopping mode 322, wherein one or more non-contiguous OFDM symbols are assigned to a terminal on a forward link or reverse link. Alternatively, each forward link frame 314 may operate according to a block hopping mode 320, wherein terminals may hop within a block of OFDM symbols. In both block hopping mode 320 and symbol rate hopping mode 322, blocks or OFDM symbols may or may not hop between forward link frames 314.

In accordance with one aspect, superframe 310 may not utilize a superframe preamble 312. In one alternative, a preamble may be provided for one or more frames 314 that include equivalent information to superframe preamble 312. In another alternative, a broadcast control channel may be utilized to contain some or all of the information of superframe preamble 312. Other information may additionally be contained in a preamble or control channel of a frame 314.

Figure 4:
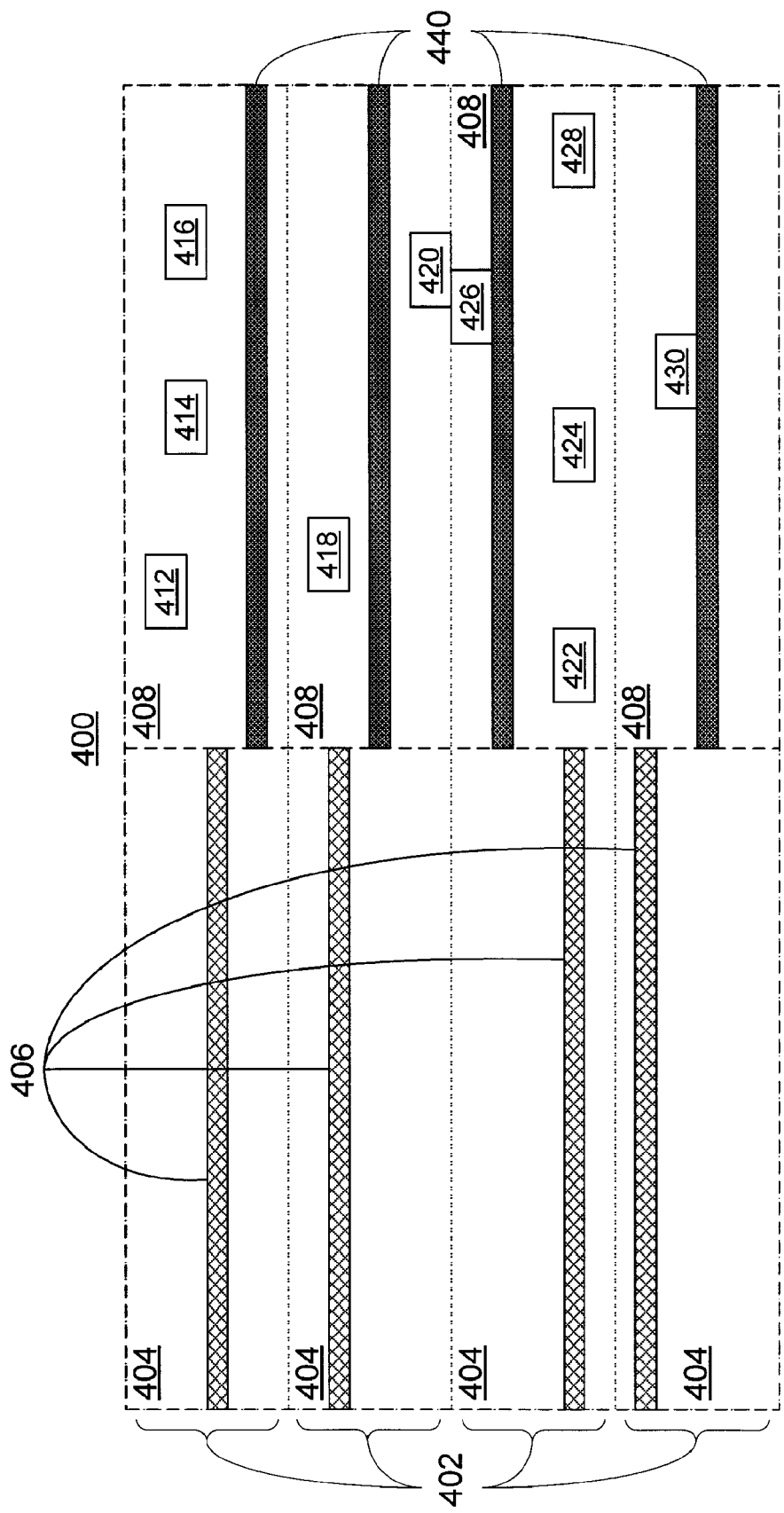
FIG. 4 illustrates an example channel structure for a multiple access wireless communication system in accordance with various aspects.

FIG. 4 is an example channel structure for a multiple access wireless communication system (e.g., system 100) in accordance with various aspects. In one example, a bandwidth 400 may be available for communication according to system design parameters. Further, the bandwidth 400 may comprise a number of carriers 402. Each carrier 402 may include one or more forward link frames 404 and reverse link frames 408, each of which may be part of one or more superframes (e.g., superframes 310).

In accordance with one aspect, each forward link frame 404 of each carrier 402 can include one or more control channels 406. By way of example, each of the control channels 406 may include information for functions related to acquisition; acknowledgements; forward link assignments for each access terminal (e.g., a terminal 120) in the system, which may be the same or different for broadcast, multicast, and unicast message types; reverse link assignments for each access terminal in the system; reverse link power control for each access terminal in the system; reverse link acknowledgements; and/or other suitable functions. It should be appreciated that the control channels 406 in each of the carriers 402 may provide uniform or non-uniform information to support the same or different functions. In addition, control channels 406 may hop in each forward link frame 404 according to hopping sequences that may be uniform or non-uniform between carriers 402. Further, the hopping sequence for each control channel 406 may be the same as or different from hopping sequences assigned to data channels (not shown) in each respective forward link frame 404.

In accordance with another aspect, each reverse link frame 408 can include a number of reverse link transmissions 412-430 from access terminals. While each reverse link transmission 412-430 in reverse link frames 408 are depicted as blocks, i.e., groups of contiguous OFDM symbols, it should be appreciated that each transmission 412-430 may alternatively utilize symbol rate hopping, wherein each transmission 412-430 may correspond to non-contiguous symbol blocks. In addition, each reverse link frame 408 may include one or more reverse link control channels 440. By way of example, reverse link control channels 440 may include feedback channels, pilot channels for reverse link channel estimation, acknowledgment channels that may be included in reverse link transmissions 412-340, and/or other appropriate channels. Further, each reverse link control channel 440 can provide information for functions related to, for example, forward link and reverse link resource requests by each access terminal in the system, channel information (e.g., channel quality information (CQI) for different types of transmission), pilots from an access terminal that may be used by an access point (e.g., a base station 110) for channel estimation purposes, and/or other suitable functions. In one example, reverse link control channels 440 can hop in each reverse link frame 408 according to hopping sequences that may be uniform or non-uniform between carriers 402. Further, the hopping sequence for each reverse link control channel 440 may be the same as or different from hopping sequences assigned to data channels (not shown) in each respective reverse link frame 408.

In accordance with one aspect, one or more orthogonal codes, scrambling sequences, or similar codes and/or sequences may be utilized to multiplex users on reverse link control channels 440, thereby separating each user and/or each unique type of information transmitted in reverse link control channels 440. In one example, orthogonal codes may be specific to a user. Additionally and/or alternatively, orthogonal codes may be allocated by an access point to each access terminal for each communication session or shorter period (e.g., each superframe 310).

In one example, some access terminals are assigned to a single carrier 402 such that each forward link transmission sent over a superframe or multiple frames of a superframe to a terminal is assigned to the same carrier. Thus, an access terminal that is capable of only demodulating a portion of bandwidth at any given time may be required only to monitor a subset of the bandwidth 400 corresponding to one carrier 402. Alternatively, an access terminal may be assigned to any number of carriers 402 that is less than all of the carriers 402 in the bandwidth. In one example, single-carrier transmissions can be supported by ensuring that forward link control channels 406 and reverse link control channels 440 contain sufficient information for each carrier 402 such that an access terminal operating on a given carrier 402 may be supported by the control channels 406 and 440 of the carrier without reference to information contained in other carriers. The required support may be provided, for example, by including equivalent channel information in the forward link control channels 406 and reverse link control channels 440 of each carrier 402. Accordingly, in accordance with one aspect, one or more of acquisition, assignment, access, request, power control, pilot, and reporting channels may exist in each of the carriers 402. These channels may be provided, for example, in a superframe preamble (e.g., superframe preamble 312) and may be included in a forward link control channel 406 and/or a reverse link control channel 440 for a carrier 402. It should be appreciated, however, that while each carrier 402 may provide the above channels, the actual encoding, transmission rates, message types and timing, resource allocations, overhead messaging, hop patterns and/or sequences, and other transmission and location parameters may vary for different carriers 402. In addition, format, transmission rate, and/or hopping information may be signaled or otherwise available to an access terminal via separate control channels not associated with a specific carrier 402 and/or via other means.

In another example, one or more terminals having a greater capability to demodulate signals may be scheduled on two or more carriers 402 within a superframe, in consecutive superframes, or during a communication session. Further, such terminals may be able to utilize different carriers 402 for reverse link frames 408 and forward link frames 404 during a communication session or superframe. Such terminals may also be scheduled on different carriers 402 in different superframes or during a communication session. Additionally and/ or alternatively, such terminals may be scheduled over frames that are substantially synchronous in time on different carriers 402. Such multi-carrier access terminals may also be scheduled to provide load balancing of resources for a given carrier 402 and provide statistical multiplexing gains throughout the total bandwidth 400.

In order to support multi-carrier access terminals operating across several carriers 402, several approaches may be utilized. In a first example, a multi-carrier access terminal may demodulate the superframe preambles and forward link control channels 406 for each of the carriers 402 across which the terminal operates individually. Thus, all assignments, scheduling, power control, and other appropriate operations can be performed on a carrier-by-carrier basis. In a second example, a separate control channel can contain operating parameters for each carrier 402, thereby allowing an access terminal to obtain information regarding the superframe preambles and forward link control channels 406 for one or more of the carriers 402 across which the terminal operates via the separate control channel. In addition, the additional control channel may also include information for demodulating and decoding one or more of superframe preambles, forward link control channels 406, and reverse link control channels 440 for one or more carriers 402. Thus, a terminal may be able to decode superframe preambles, forward link control channels 406, and/or reverse link control channels 440 for a given carrier 402 at any time.

In a third example, information for all carriers 402 or groups of carriers 402 may be maintained in the superframe preambles, forward link control channels 406, and/or reverse link control channels 340 of a single carrier 402. In this example, an access terminal capable of utilizing multiple carriers in a communication session may receive control information from a single carrier and transmit control information in the same carrier or a different carrier. In accordance with one aspect, the carriers utilized for this functionality may vary over time according to a predetermined sequence or some other means. In a fourth example, an assignment for the purposes of scheduling may constitute multiple assignments from different carriers 402. Thus, an access terminal may receive individual assignments on multiple carriers 402 and then combine those assignments to determine a complete assignment for frames that may or may not overlap in time for both the forward and reverse links.

In a specific, non-limiting example, bandwidth 400 can be 20 MHz and each carrier 402 can comprise 5 MHz of bandwidth 400. In addition, each carrier 402 may comprise 512 subcarriers. However, it should be appreciated that other sizes for bandwidth 400, sizes for carriers 402, and/or numbers of subcarriers for carriers 402 may be utilized. For example, a carrier 402 may comprise 1.25 MHz of bandwidth and 128 subcarriers. Alternatively, a carrier 402 may also comprise 2.5 MHz of bandwidth and 256 subcarriers. Further, the number of allocated subcarriers may vary between carriers 402. The size of carriers 402 may also be subject to applicable bandwidth allotments, and divisions thereof, from an applicable regulatory entity in the system. In addition, it should be appreciated that one or more carriers 402 may be asynchronous with respect to each other such that one or more carriers 402 may have different start and/or end times for forward link frames 404 and/or reverse link frames 408. In such a case, signaling or assignment messages provided by a control channel 406 and/or a superframe preamble may communicate timing information for a carrier 402.

In accordance with one aspect, one or more available subcarriers in an OFDM symbol in a carrier 402 may be designated as guard subcarriers and not modulated such that no energy is transmitted on designated subcarriers. In one example, the number of designated guard subcarriers in a superframe preamble and in each frame may be provided via one or more messages in forward link control channels 406 and/or the superframe preamble. In accordance with another aspect, a packet may be jointly encoded for a multi-carrier access terminal in order to reduce overhead transmission to the terminal. This may be done, for example, even if the symbols of the packets are to be transmitted over subcarriers of different carriers 402. In this way, a single cyclic redundancy check may be utilized for one or more packets such that transmissions on some carriers 402 that include symbols from said packets are not subject to overhead transmissions of cyclic redundancy checks. Alternatively, an access point may modulate its packets on a per-carrier basis by including only symbols to be transmitted on a given carrier 402 in a given packet. In one example, the access point may further group certain carriers 402 together for the purposes of packet modulation. For example, the access point may modulate symbols from the top two carriers 402 together in a single packet.

In addition, it should be appreciated that schedulers for each of the carriers 402 may utilize uniform or non-uniform approaches to hopping. For example, different channel trees or hop permutations may be used for each carrier 402. Further, each carrier 402 may be scheduled according to uniform or non-uniform techniques and algorithms. For example, each carrier 402 may include channel trees and structures as described in co-pending U.S. patent application Ser. No. 11/261,837, filed Oct. 27, 2005, entitled "SDMA RESOURCE MANAGEMENT," the entirety of which is incorporated herein by reference.

Figure 5A:
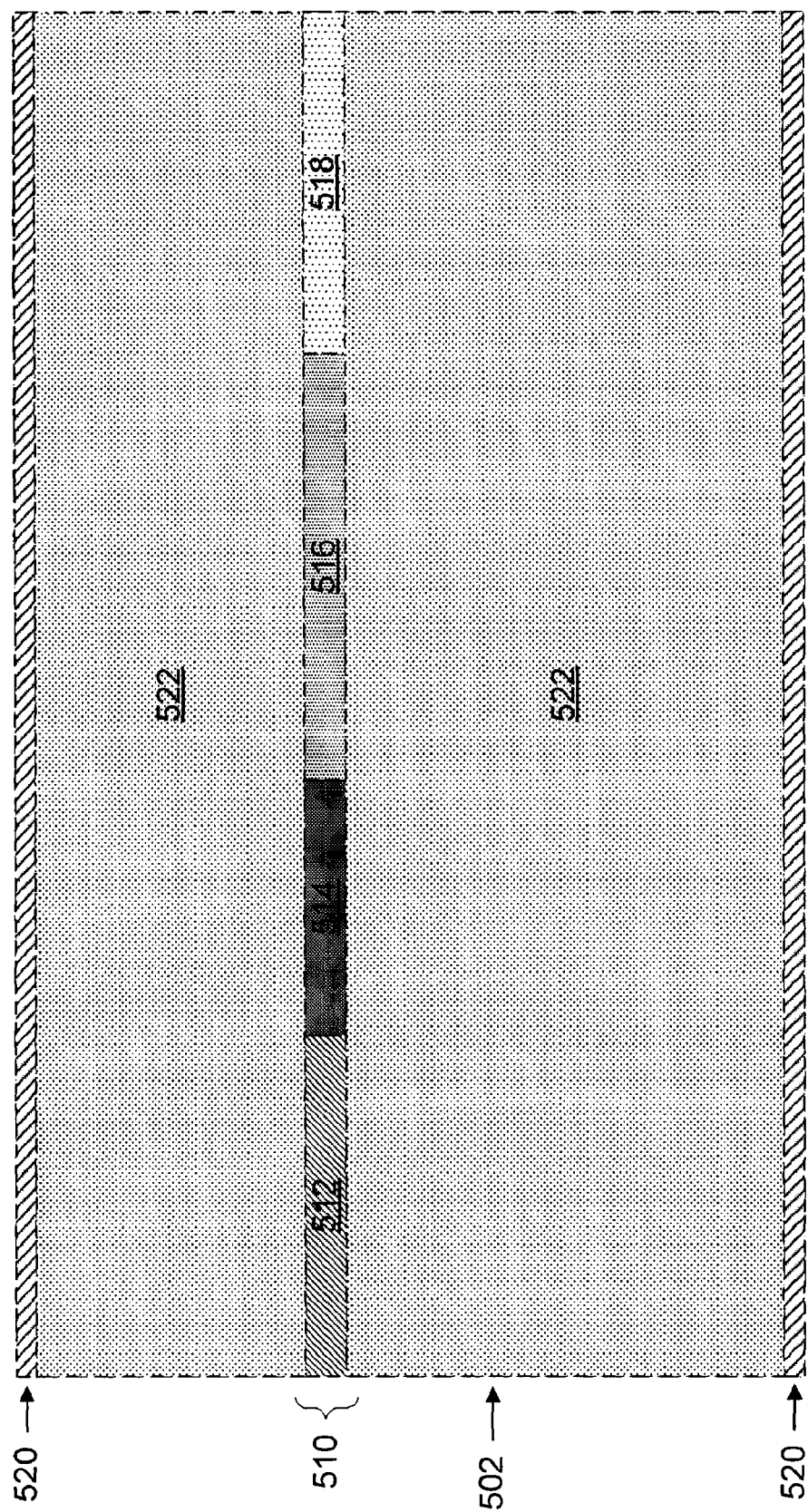
FIG. 5A illustrates an example forward link frame structure for a multiple access wireless communication system.

FIG. 5A illustrates an example forward link frame structure 502 for a multiple access wireless communication system in accordance with various aspects. In one example, forward link frame 502 may be divided into a control channel 510 and one or more data channels 522. In accordance with one aspect, control channel 510 can comprise a contiguous or non-contiguous group of subcarriers. Further, a variable number of subcarriers can comprise control channel 510. The number of subcarriers that comprise control channel 510 may be assigned depending on a desired amount of control data and/or other suitable considerations. In accordance with another aspect, data channels 522 can be generally available for data transmission.

In one example, control channel 510 can include one or more signaling channels 512-518. While signaling channels 512-518 are illustrated in forward link frame 502 as being multiplexed in time, it should be appreciated that signaling channels 512-518 may also be multiplexed using different orthogonal, quasi-orthogonal, or scrambling codes; different frequencies; and/or any combinations of time, code, and frequency. In one example, the signaling channels 512-518 can include one or more pilot channels 512 and/or 514. In a non-limiting example in which forward link frame 502 is utilized in symbol rate hopping mode (e.g., symbol rate hopping mode 322), pilot channels 512 and/or 514 may be present on each OFDM symbol in forward link frame 502. Thus, pilot channels 512 and/or 514 may not be present in control channel 510 in such an example. In another example, control channel 510 can include one or more of a signaling channel 516 and a power control channel 518. In one example, signaling channel 516 can include assignment, acknowledgement, and/or power references and adjustments for data, control, and pilot/or transmissions on the reverse link. Further, power control channel 518 can include information regarding interference generated at various sectors in a wireless communication system (e.g., sectors 104 of system 100) due to transmissions from access terminals (e.g., terminals 120) in a sector.

In a specific, non-limiting example, power control channel 518 may be present on only a single carrier (e.g., a carrier 402). In this example, all single-carrier access terminals can be scheduled on the scheduled carrier while multi-carrier access terminals can tune to the scheduled carrier for power control. Thus, a single power reference may be utilized in accordance with one aspect. Also, it is possible in such an aspect that multi-carrier access terminals may hop their reverse link control channel (e.g., reverse link control channel 440) between different frames over time such that reverse link control channel(s) are not simply transmitted in the same frame(s) as reverse link data transmissions. In this case, a single reference may be utilized for multi-carrier access terminals to adjust the transmission power of said terminals across all carriers, thereby allowing uniform power control over all carriers for reverse link transmissions by the multi-carrier access terminals. Alternatively, a multi-carrier access terminal may require multiple power control loops, one for each carrier or a group of carriers having a common power control channel 518. In this case, transmission on a single carrier or group of carriers may be done on an individual basis. Further, different power references and/or back-offs may be utilized for each carrier or group of carriers.

In accordance with another aspect, forward link frame 502 can further include subcarriers 520 at the edge of the bandwidth allocated to forward link frame 502. These subcarriers 520 may function, for example, as quasi-guard subcarriers. In accordance with one or more of the above aspects, it should be appreciated that that where multiple transmit antennas (e.g., at a base station 110 and/or a terminal 120) can be used to transmit for a sector, each of the transmit antennas used may share common superframe timing, superframe indices, OFDM symbol characteristics, and/or hop sequences. Further, it should be appreciated that control channel 510 may comprise the same allocations as a data transmission in one or more aspects. For example, if one or more data transmissions utilize block hopping (e.g., via block hopping mode 320), then blocks of similar or non-similar sizes may be allocated for control channel 510.

Figure 5B:
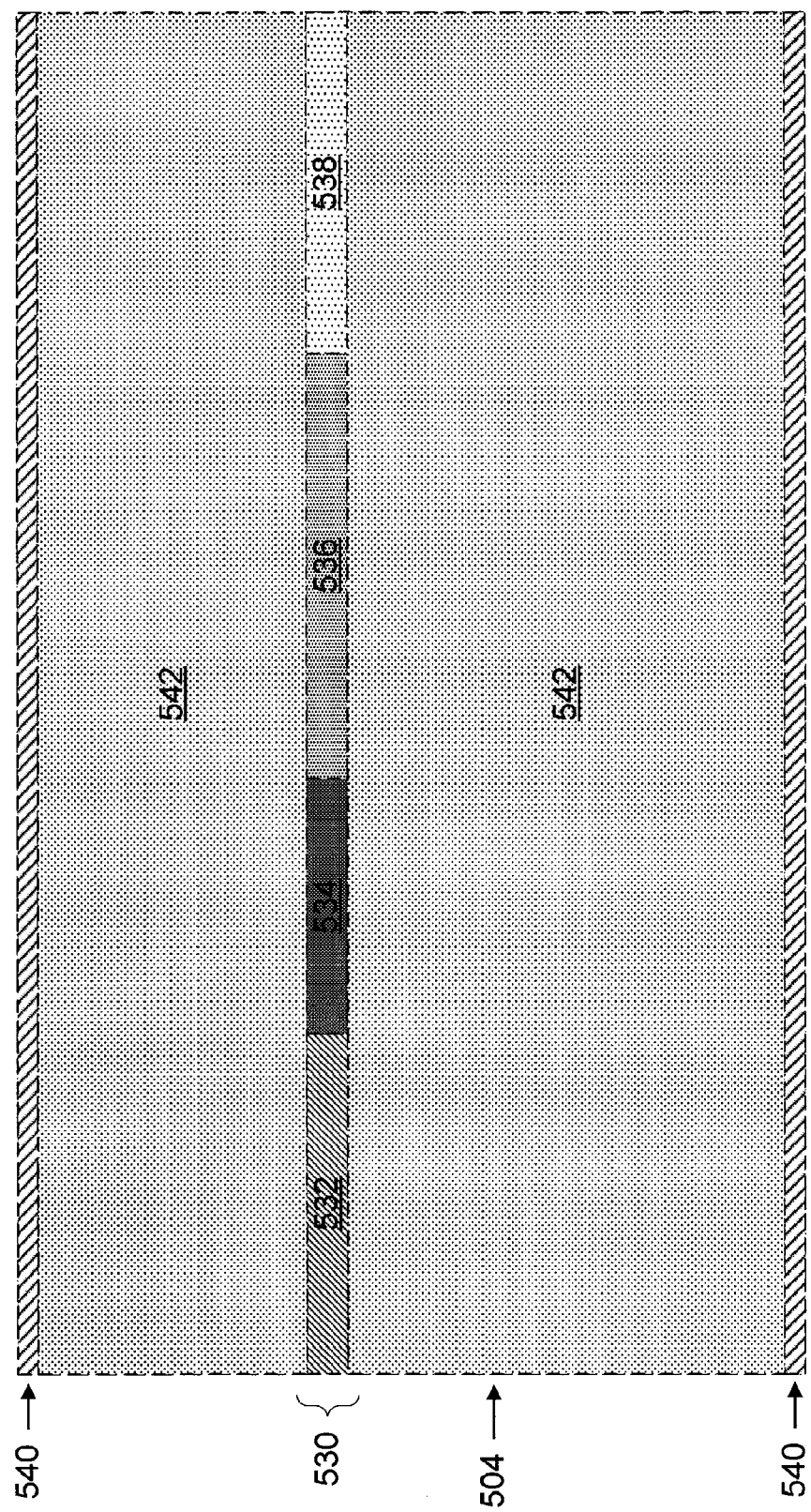
FIG. 5B illustrates an example reverse link frame structure for a multiple access wireless communication system.

FIG. 5B illustrates an example reverse link frame structure 504 for a multiple access wireless communication system in accordance with various aspects. In one example, reverse link frame 504 can include a control channel 530, one or more data channels 542, and one or more edge subcarriers 540 in a similar manner to forward link frame 502. In alternative examples, data channels 542 can operate according to a block hopping mode (e.g., block hopping mode 320) or a symbol rate hopping mode (e.g., symbol rate hopping mode 322) in a given reverse link frame 504. Additionally, data channels may operate according to a single mode at different reverse link frames 504 or according to different modes for different reverse link frames 504. Further, control channel 530 can be composed of signaling channels 532-538 that may be multiplexed in time as illustrated in reverse link frame 504. Alternatively, signaling channels 532-538 may be multiplexed using different orthogonal, quasi-orthogonal, or scrambling codes; different frequencies; and/or any combinations of time, code, and frequency.

In one example, signaling channels 532-538 in control channel 530 can include a pilot channel 532. Pilot channel 532 can include pilots, which in one example can allow an access point (e.g., a base station 110) to estimate the reverse link. Control channel 530 may also include a request channel 534, which can include information to allow an access terminal (e.g., a terminal 120) to request resources for upcoming forward link frames 502 and/or reverse link frames 504.

In another example, control channel 530 can include a reverse link feedback channel 536, on which one or more access terminals can provide feedback with respect to channel information (CQI). In one example, CQI provided on reverse link feedback channel 536 by an access terminal can relate to one or more scheduled modes and/or available modes for scheduling for a transmission to the access terminal. By way of example, modes to which the CQI can relate include beamforming, SDMA, precoding, and/or any suitable combination thereof. In another example, control channel 530 can further include a power control channel 538, which can be used as a reference to allow an access point to generate power control instructions for one or more reverse link transmissions (e.g., data transmissions and/or signaling transmissions) by an access terminal. In one example, one or more feedback channels 536 may be included in power control channel 538.

Referring to FIGS. 6-11, methodologies for signal acquisition in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 6:
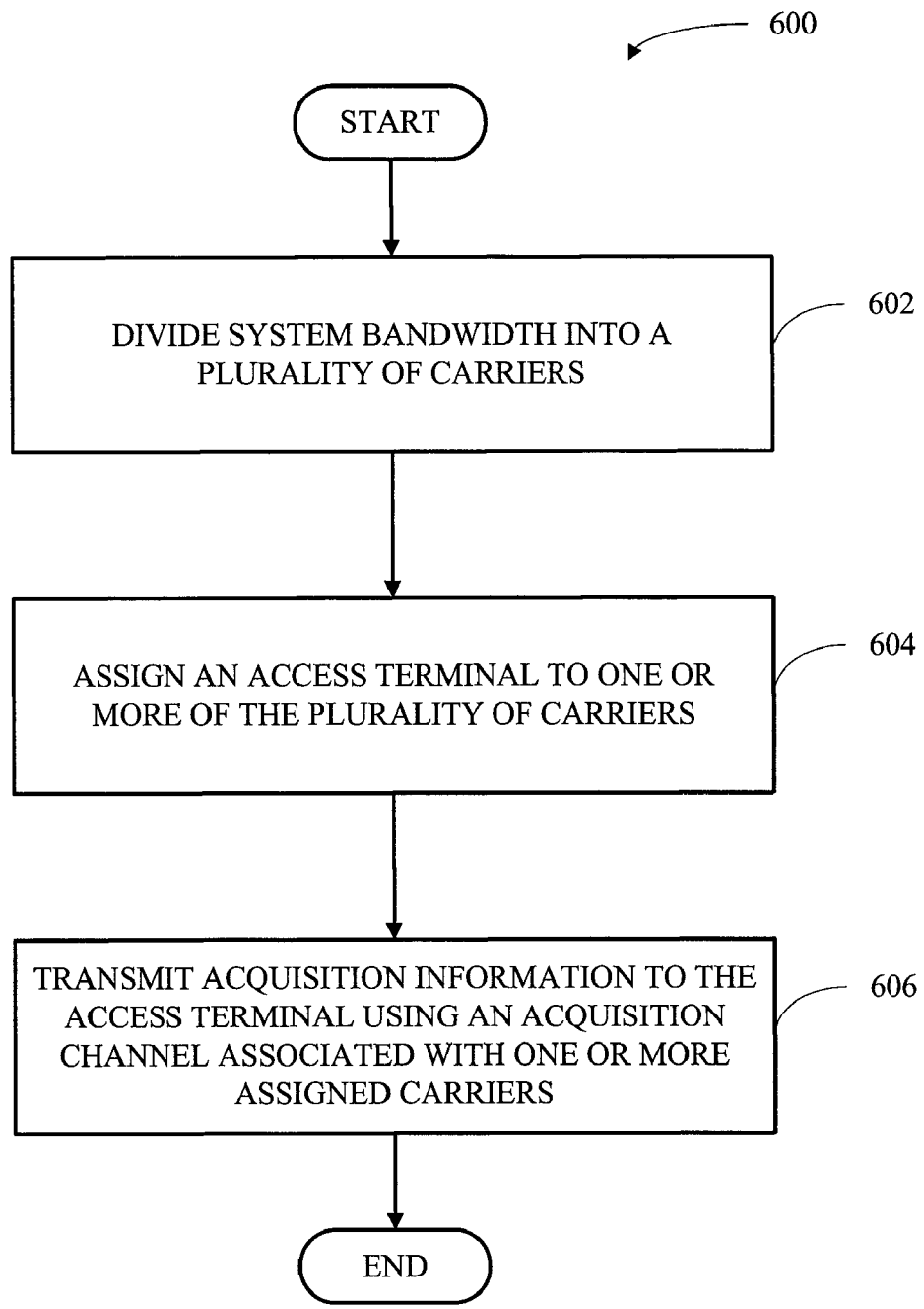
FIG. 6 is a flow diagram of a methodology for transmitting acquisition information in a wireless communication system.

With reference to FIG. 6, illustrated is a methodology 600 for transmitting acquisition information in a wireless communication system (e.g., system 200). Methodology 600 can be performed, for example, by an access point (e.g., access point 210) and/or an antenna group (e.g., an antenna group 212) within an access point. Methodology 600 begins at block 602, wherein system bandwidth (e.g., bandwidth 400) is divided into a plurality of carriers (e.g., carriers 402). Next, an access terminal (e.g., an access terminal 220) is assigned to one or more of the plurality of carriers at block 604. Methodology 600 then concludes at block 606, wherein acquisition information is transmitted to the access terminal using an acquisition channel associated with an assigned carrier. The acquisition channel may be included, for example, in a forward link control channel (e.g., forward link control channel 406) associated with an assigned carrier. Further, the acquisition information may include one or more of acquisition pilots, a primary broadcast channel, and/or a secondary broadcast channel.

Figure 7:
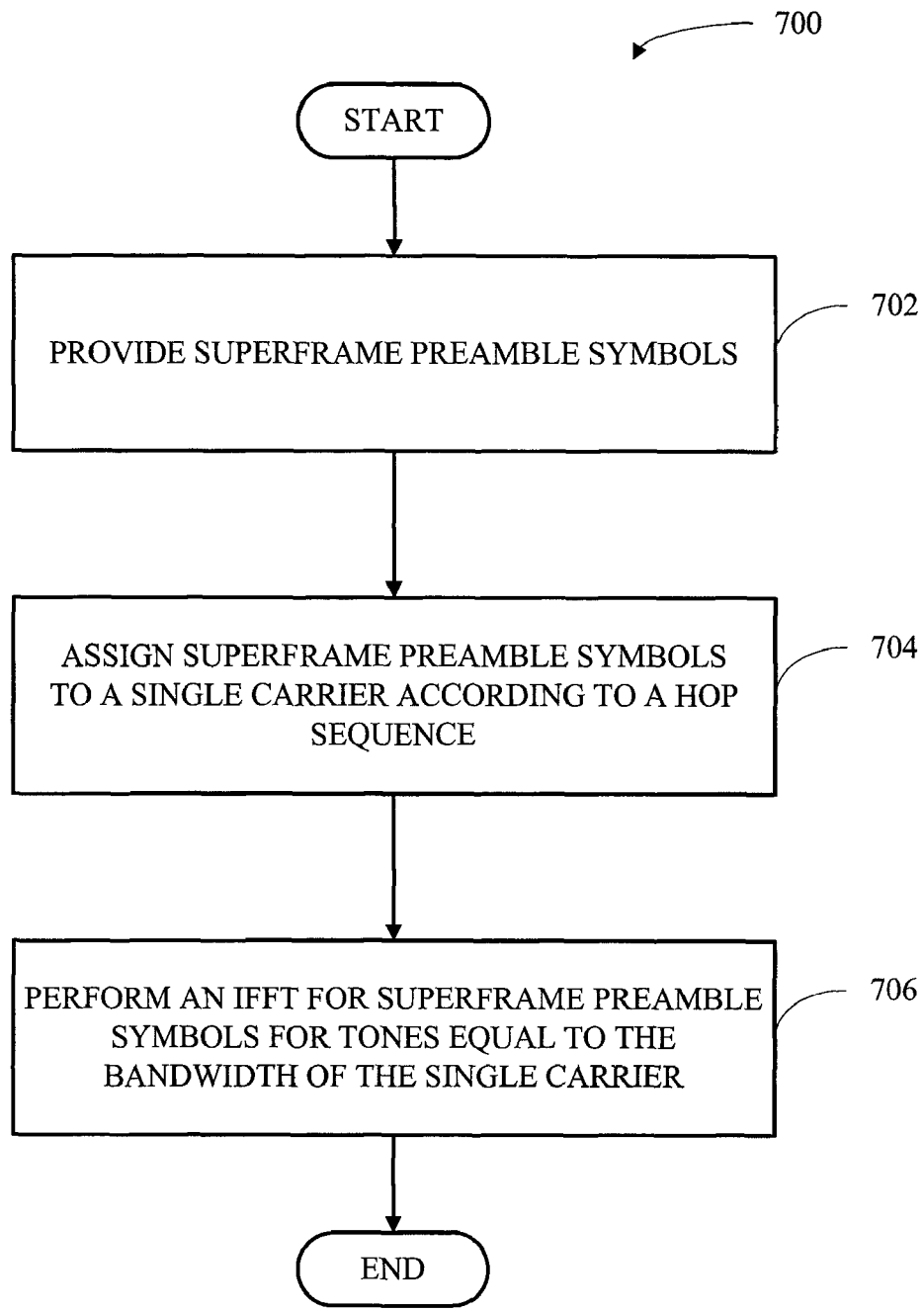
FIG. 7 is a flow diagram of a methodology for generating and transmitting acquisition information in a wireless communication system.

FIG. 7 illustrates a methodology 700 for generating and transmitting acquisition information in a wireless communication system (e.g., system 200). Methodology 700 can be performed, for example, by a base station and/or an antenna group within a base station. Methodology 700 begins at block 702, wherein symbols for a superframe preamble (e.g., a superframe preamble 312) are provided. The provided symbols can include, for example, acquisition information, other sector interference information, pilots, and/or other appropriate information based on the particular system design. Methodology 700 then proceeds to block 704, wherein a carrier is assigned for which the superframe preamble will be transmitted. In one example, this assignment can be based upon a hop sequence, pattern, or another predetermined assignment scheme. For example, each access point and/or sector in a system may be assigned a specific pseudo-noise (PN) sequence that uniquely identifies the access point or sector among neighboring access points and/or sectors. Further, to reduce the required computation for signal acquisition, all available PN sequences for the system may be arranged into $M_1$ sets, each set containing $M_2$ PN sequences. A PN sequence assigned to a particular access point and/or sector may then be input into an algorithm that can determine the carrier assignment at block 704. In one example, the algorithm used may vary over time. For example, the algorithm may vary after a number of uses equal to the number of PN sequences for which the algorithm is employed or another predetermined number of uses.

In another example, access point identification may be transmitted as part of an acquisition signal, which may in turn be part of the superframe preamble for which a carrier is assigned at block 704. An access terminal may then use this identification to scramble one or more received pilots, to identify an access point from which a transmission is received, and/or to perform another appropriate action. Additionally and/or alternatively, each access point or sector can spread an acquisition signal over one or more carriers assigned at block 704 according to a Walsh sequence that uniquely identifies the access point or sector in order to allow an access terminal to efficiently perform signal acquisition by using a Walsh-Hadamard transform. Upon completing the act described at block 704, methodology concludes at block 706, wherein an Inverse Fourier Transform (IFFT) is performed to provide time domain samples for a predetermined number of subcarriers. The predetermined number of subcarriers used at block 706 can be equal to some or all of the subcarriers of the carrier assigned at block 704.

Figure 8:
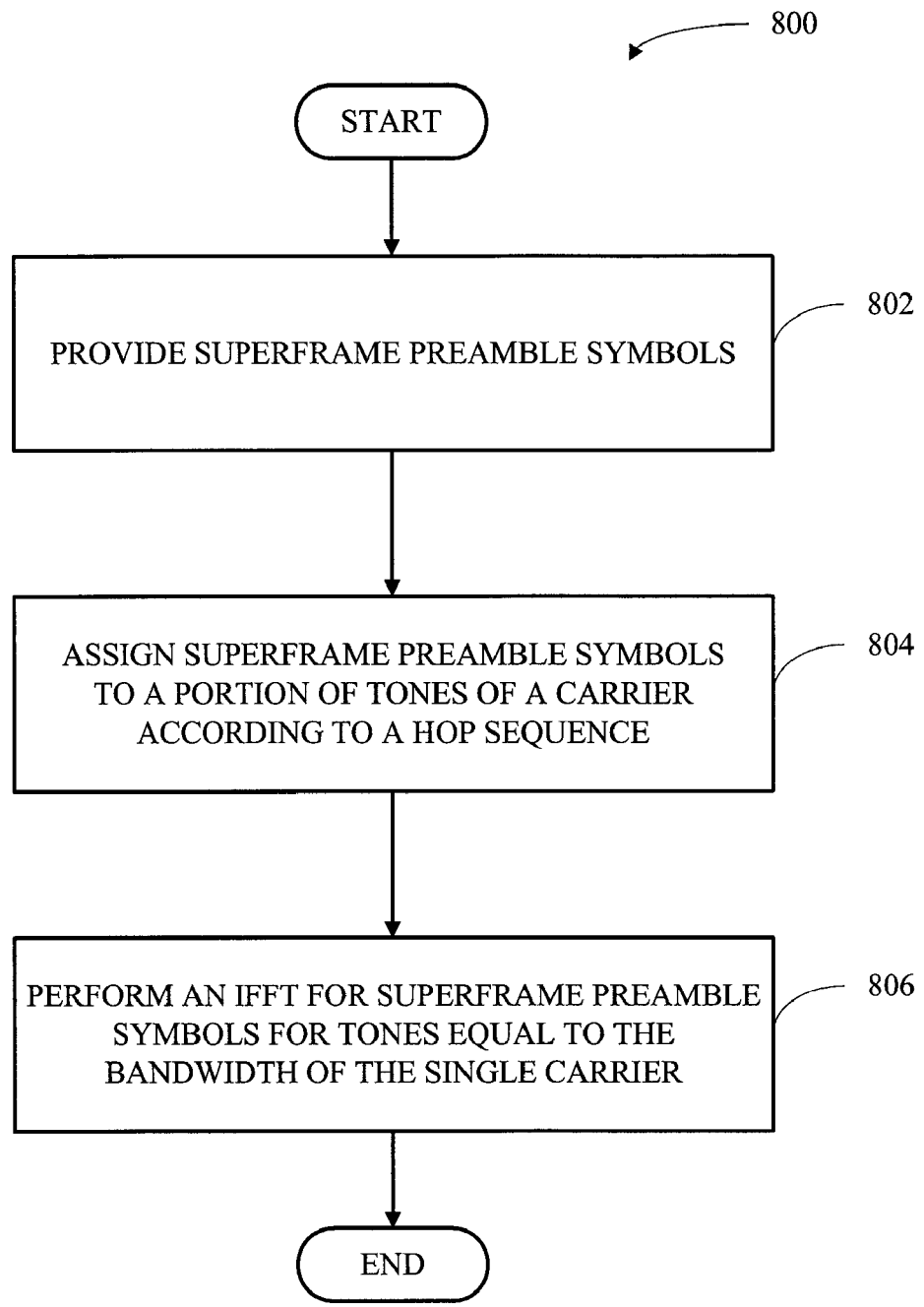
FIG. 8 is a flow diagram of a methodology for generating and transmitting acquisition information in a wireless communication system.

FIG. 8 illustrates a methodology 800 for generating and transmitting acquisition information in a wireless communication system (e.g., system 200). Methodology 800 can be performed, for example, by a base station and/or an antenna group within a base station. Methodology 800 begins at block 802, wherein symbols for a superframe preamble are provided. The provided symbols can include, for example, acquisition information, other sector interference information, pilots, and/or other appropriate information based on the particular system design. Methodology 800 then proceeds to block 804, wherein information is assigned to a group of subcarriers or tones that comprise all or part of a carrier on which the superframe preamble may be transmitted.

In one example, this assignment can be based upon a hop sequence, pattern, or another predetermined assignment scheme. For example, each access point and/or sector in a system may be assigned a specific pseudo-noise (PN) sequence that uniquely identifies the access point or sector among neighboring access points and/or sector. A PN sequence assigned to a particular access point and/or sector may then be input into an algorithm that can determine the subcarrier assignment at block 804. In one example, the algorithm used may vary over time. For example, the algorithm may vary after a number of uses equal to the length of the PN sequences for which the algorithm is employed or another predetermined number of uses. Upon completing the act described at block 804, methodology concludes at block 806, wherein an Inverse Fourier Transform (IFFT) is performed to provide time domain samples for a predetermined number of subcarriers. The predetermined number of subcarriers used at block 806 can be equal to some or all of the subcarriers of the carrier assigned at block 804.

Figure 9:
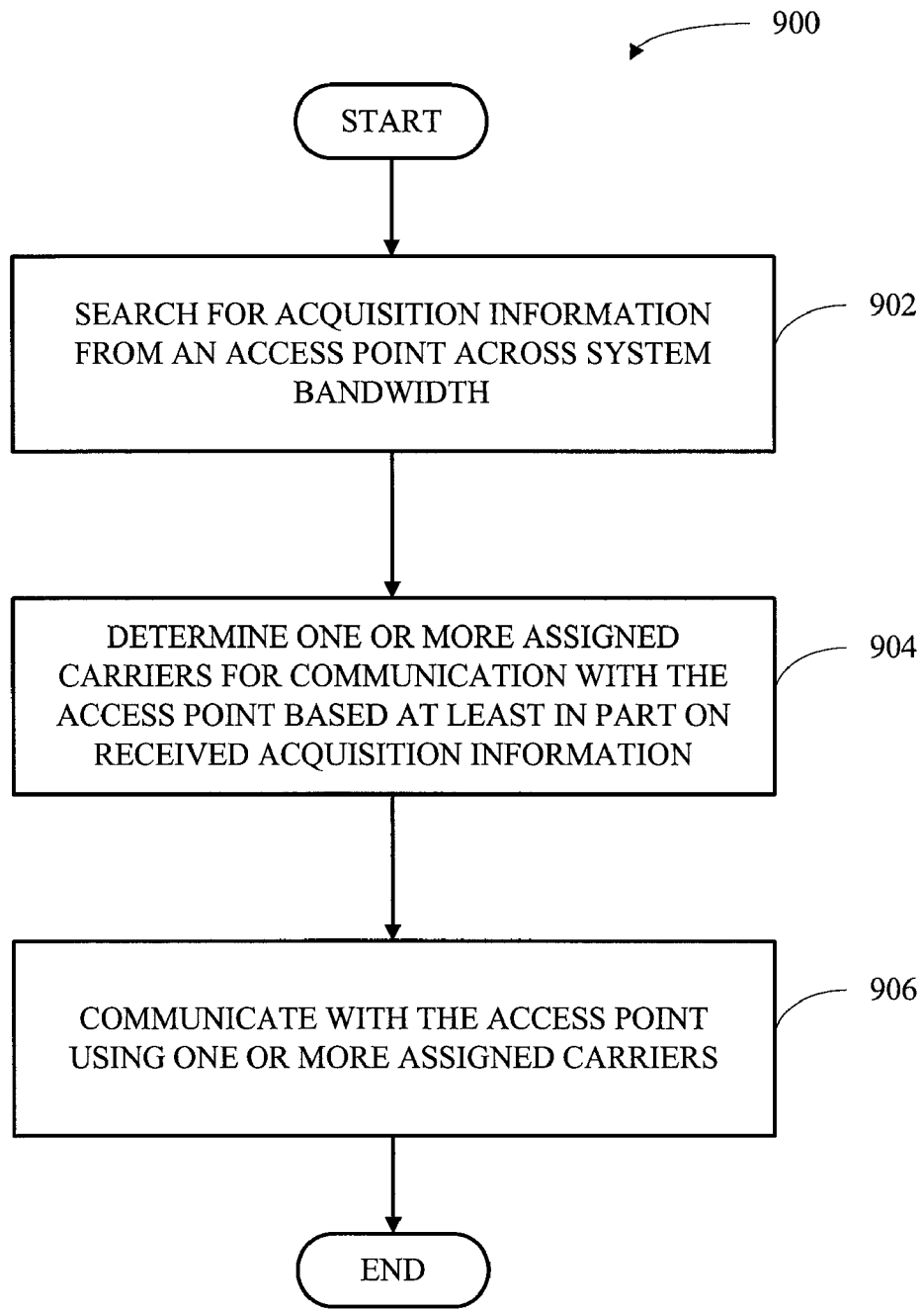
FIG. 9 is a flow diagram of a methodology for communicating on one or more carriers in a wireless communication system.

Referring now to FIG. 9, illustrated is a methodology 900 for communicating on one or more carriers (e.g., carriers 402) in a wireless communication system (e.g., system 200). Methodology 900 can be performed, for example, by a terminal (e.g., an access terminal 220). Methodology 900 begins at block 902, wherein a search is conducted across available system bandwidth (e.g., bandwidth 400) for acquisition information from an access point (e.g., access point 210). Alternatively, acquisition information may be received from an antenna group (e.g., an antenna group 212) within an access point. In one example, the search at block 902 is conducted across all of the available system bandwidth. Alternatively, the search at block 902 may be conducted across one or more predetermined carriers within the system bandwidth.

Next, methodology 900 proceeds to block 904, wherein one or more assigned carriers are determined for communication with the access point and/or antenna group based at least in part on received acquisition information. In one example, the acquisition information is received as a result of the search conducted at block 902. Further, the received acquisition information may be received on a single carrier within the system bandwidth. In this example, the one or more carriers assigned at block 904 may or may not include the carrier on which the acquisition was received. Upon completing the act described at block 904, methodology 900 concludes at block 906, wherein communication is made with the access point using one or more of the carriers assigned at block 904.

Figure 10:
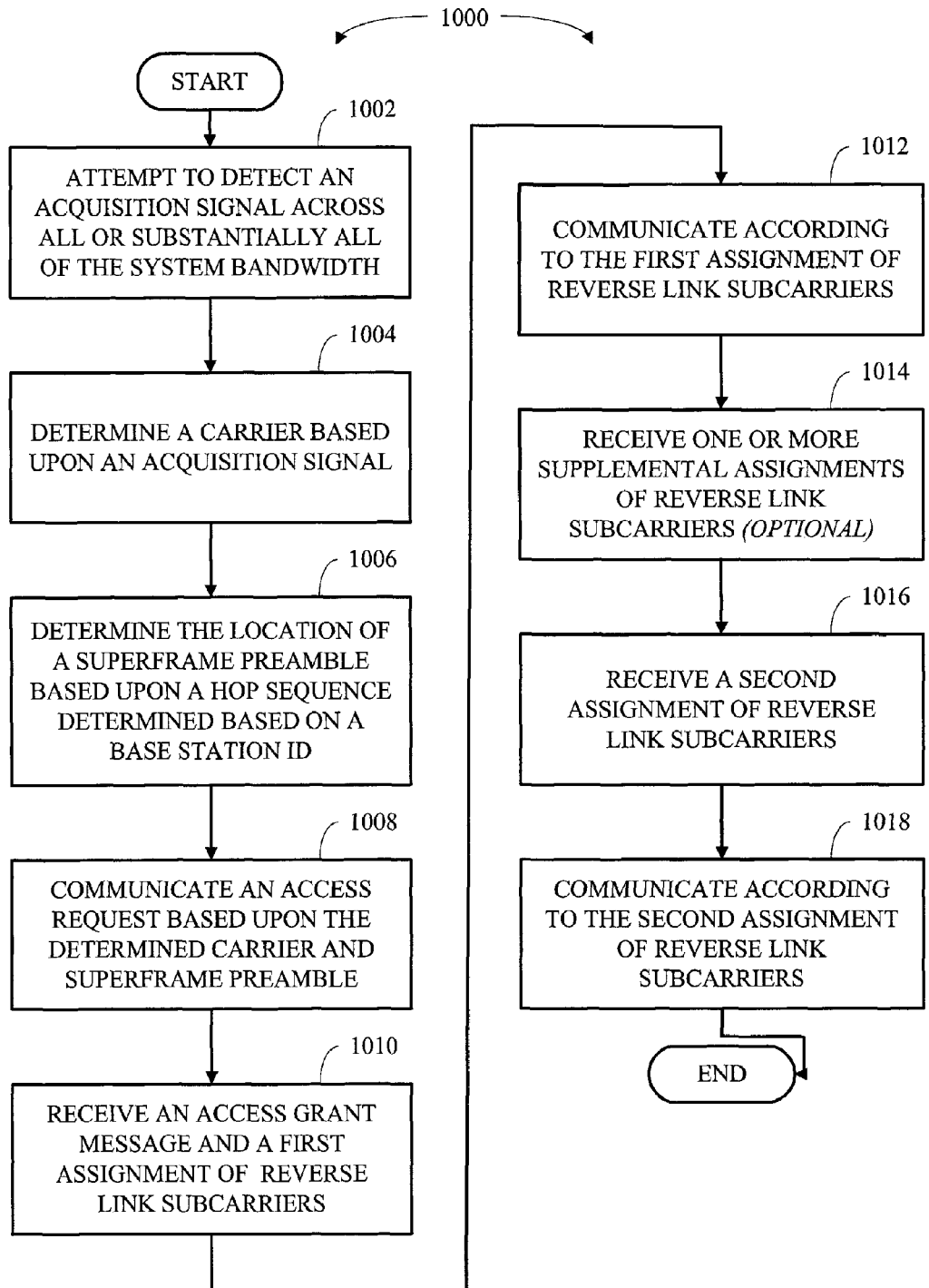
FIG. 10 is a flow diagram of a methodology for acquiring information for communication in a wireless communication system.

FIG. 10 illustrates a methodology 1000 for acquiring information for communication in a wireless communication system (e.g., system 200). Methodology 1000 can be performed, for example, by a terminal. Methodology 1000 begins at block 1002, wherein an attempt is made to detect an acquisition signal across all or substantially all of the available system bandwidth. In one example, the acquisition signal may be transmitted by a base station and/or an antenna group as part of a superframe preamble (e.g., a superframe preamble 312). Further, the acquisition signal may span all or substantially all (e.g., all but guard subcarriers 520 and/or 540) of a carrier. Once an acquisition signal is detected, methodology 1000 proceeds to block 1004, wherein a carrier is determined based upon the location of the subcarriers on which the acquisition signal was received. Methodology 1000 then further proceeds to block 1006, wherein the location of a superframe preamble is determined for an upcoming frame (e.g., a frame 314) based upon a hop sequence. In one example, the hop sequence can be determined based upon a base station identification included in the acquisition signal detected at block 1002.

Methodology 1000 may then proceed to block 1008, wherein an access request is communicated based on the carrier determined at block 1004 and/or the superframe preamble determined at block 1006. In one example, the access request can be modulated with an orthogonal or scrambling code corresponding to whether communication may be conducted on multiple carriers simultaneously (e.g., by a terminal performing methodology 1000). This orthogonal or scrambling code may be pre-provisioned or signaled with the acquisition information detected at block 1002.

In response to the access request communicated at block 1008, an access grant message can be received at block 1010 that acknowledges the access request and/or assigns initial reverse link subcarriers or block of subcarriers. In one example, the access grant received at block 1010 may include a timing adjustment that can facilitate the alignment of one or more reverse link transmissions (e.g., transmissions made at blocks 1012 and/or 1018) with the reverse link timing of an access point. The initial assignment received at block 1010 may also include an instruction to operate in a symbol rate hopping mode (e.g., symbol rate hopping mode 322) or a block hopping mode (e.g., block hopping mode 320), an assignment for one or more subcarriers to be used for communication in both the forward link and the reverse link, and/or other timing and scheduling parameters. Upon receiving the access grant message at block 1010, an entity performing methodology 1000 may then communicate at block 1012 according to the first assignment received at block 1010.

Next, one or more supplemental assignments may be assigned at block 1014. It should be appreciated that the act described at block 1014 is optional and need not be performed in connection with methodology 1000. Thus, methodology 1000 may proceed to block 1016 after either block 1012 or 1014, wherein a second assignment of reverse link subcarriers is received. In one example, if it is established at block 1006 that communication may be conducted on multiple carriers simultaneously, the second assignment received at block 1016 can include a change carrier message and may identify the carrier for which the next or current assignment will apply. Alternatively, the change carrier message may be transmitted prior to and independently from the second assignment received in block 1016 and/or any supplemental assignments received at block 1014. Further, the change carrier message may be transmitted on the forward link as one or more data packets. The data packets may then be acknowledged by an entity performing methodology 1000 to indicate that the change carrier message has been demodulated. In another alternative, the access grant received at block 1000 may include change carrier information. This information may be provided on an initial basis or on a carrier-by-carrier basis if each carrier is accessed separately.

In accordance with one aspect, the second assignment received at block 1016 may include multiple assignments on different carriers that may be individually decoded. Alternatively, the second assignment may include a joint assignment for more than one carrier received via a single carrier. In accordance with another aspect, information regarding timing and other properties of a carrier may be provided with the second assignment in order to improve operation on a newly scheduled carrier. If one or more data packets are utilized to signal a change carrier message, the data packets may include certain parameters for the newly scheduled carrier, thus allowing additional resources to provide information for proper communication on the new carrier. Alternatively, each carrier may include information in one or more superframe preambles or control channels (e.g., control channels 406 and/or 440) to allow communication on other carriers, to allow demodulation of superframe preambles and/or control channels of other carriers, or other suitable information. Additionally, a separate message may be received (e.g., via control channels 406 and/or 440 for a carrier) that includes the parameters for the new carrier. Once the second assignment is received at block 1016, methodology 1000 concludes at block 1018, wherein communication is conducted according to the second assignment. In one example, an entity performing methodology 1000 can tune to an alternative carrier when acquisition information corresponding to an assigned carrier cannot be properly demodulated (e.g., at block 1004).

Figure 11:
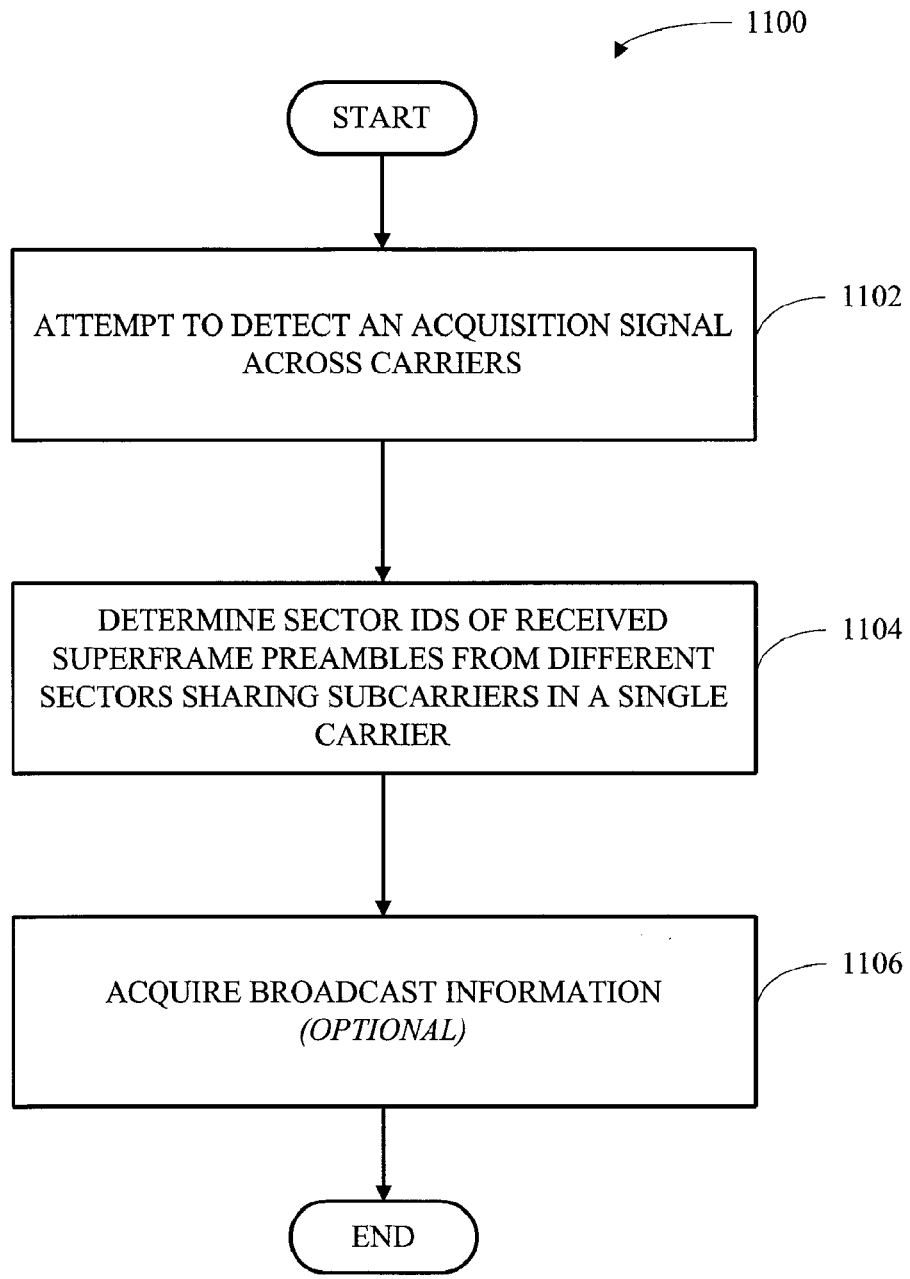
FIG. 11 is a flow diagram of a methodology for acquiring information for communication in a wireless communication system.

FIG. 11 illustrates a methodology 1100 for acquiring information for communication in a wireless communication system (e.g., system 200). Methodology 1100 can be performed, for example, by a terminal. Methodology 1100 begins at block 1102, wherein an attempt is made to detect an acquisition signal across all or substantially all of the available system bandwidth. In one example, the acquisition signal may be transmitted by a base station and/or an antenna group as part of a superframe preamble (e.g., a superframe preamble 312). Further, the acquisition signal may span all or substantially all (e.g., all but guard subcarriers 520 and/or 540) of a carrier.

Upon detecting an acquisition symbol at block 1102, methodology 1100 proceeds to block 1104, wherein a sector (e.g., a sector 104) from which the acquisition signal was transmitted is determined based upon the location of the subcarriers used for the acquisition signal in a carrier or a larger group of subcarriers allocated to a superframe preamble. In one example, the sector determined at block 1104 can correspond to an antenna group within a base station in the system. Further, the sector may be determined at step 1104 at least in part by determining an identifier for the sector, such as a sector ID. Finally, methodology 1100 may conclude at block 1106, wherein broadcast information is acquired over a first broadcast channel and/or a second broadcast channel. It should be appreciated, however, that the act described in block 1106 is optional and may be omitted, for example, where there is a sticky assignment or an entity performing methodology 1100 is already scheduled.

Figure 12:
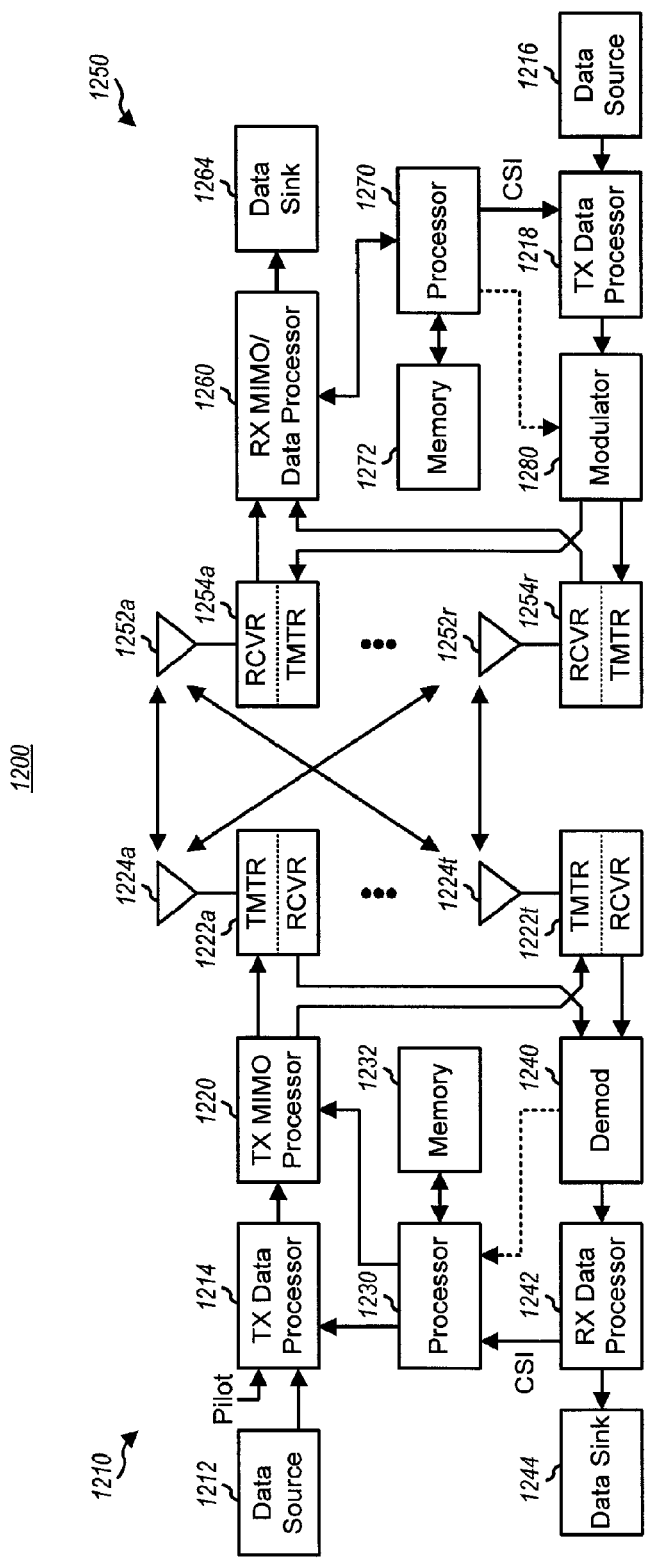
FIG. 12 is a block diagram illustrating an example wireless communication system in which one or more embodiments described herein may function.

Referring now to FIG. 12, a block diagram illustrating an example wireless communication system 1200 in which one or more embodiments described herein may function is provided. In one example, system 1200 is a multiple-input multiple-output (MIMO) system that includes a transmitter system 1210 and a receiver system 1250. It should be appreciated, however, that transmitter system 1210 and/or receiver system 1250 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 1210 and/or receiver system 1250 described herein could be utilized in connection with a single output to single input antenna system.

In accordance with one aspect, traffic data for a number of data streams are provided at transmitter system 1210 from a data source 1210 to a transmit (TX) data processor 1214. In one example, each data stream can then be transmitted via a respective transmit antenna 1224. Additionally, TX data processor 1214 can format, code, and interleave traffic data for each data stream based on a particular coding scheme selected for each respective data stream in order to provide coded data. In one example, the coded data for each data stream may then be multiplexed with pilot data using OFDM techniques. The pilot data can be, for example, a known data pattern that is processed in a known manner. Further, the pilot data may be used at receiver system 1250 to estimate channel response. Back at transmitter system 1210, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 1230.

Next, modulation symbols for all data streams can be provided to a TX processor 1220, which may further process the modulation symbols (e.g., for OFDM). TX MIMO processor 1220 may then provides $N_T$ modulation symbol streams to $N_T$ transmitters (TMTR) 1222*a* through 1222*t*. In one example, each transmitter 1222 can receive and process a respective symbol stream to provide one or more analog signals. Each transmitter 1222 may then further condition (e.g., amplify, filter, and upconvert) the analog signals to provide a modulated signal suitable for transmission over a MIMO channel. Accordingly, $N_T$ modulated signals from transmitters 1222*a* through 1222*t* can then be transmitted from $N_T$ antennas 1224*a* through 1224*t*, respectively.

In accordance with another aspect, the transmitted modulated signals can be received at receiver system 1250 by $N_R$ antennas 1252a through 1252r. The received signal from each antenna 1252 can then be provided to a respective receiver (RCVR) 1254. In one example, each receiver 1254 can condition (e.g., filter, amplify, and downconvert) a respective received signal, digitize the conditioned signal to provide samples, and then processes the samples to provide a corresponding "received" symbol stream. An RX MIMO/data processor 1260 can then receive and process the $N_R$ received symbol streams from $N_R$ receivers 1254 based on a particular receiver processing technique to provide $N_T$ "detected" symbol streams. In one example, each detected symbol stream can include symbols that are estimates of the modulation symbols transmitted for the corresponding data stream. RX processor 1260 can then process each symbol stream at least in part by demodulating, deinterleaving, and decoding each detected symbol stream to recover traffic data for a corresponding data stream. Thus, the processing by RX data processor 1218 may be complementary to that performed by TX MIMO processor 1220 and TX data processor 1214 at transmitter system 1210.

In another example, RX processor 1260 may be limited in the number of subcarriers that it may simultaneously demodulate. For example, RX processor 1260 may be limited to 512 subcarriers at 5 MHz, 128 subcarriers at 1.25 MHz, or 256 subcarriers at 2.5 MHz. This limitation may be, for example, a function of the FFT range of RX processor 1260, which may be defined by sample rates at which RX processor 1260 may operate, the memory available for FFT, and/or other functions available for demodulation. The expense of receive system 1250 may also increase with an increase in the number of subcarriers utilized. In accordance with one aspect, the channel response estimate generated by RX processor 1260 may be used to perform space/time processing at the receiver, adjust power levels, change modulation rates or schemes, and/or other appropriate actions. Additionally, RX processor 1260 may further estimate channel characteristics such as, for example, signal-to-noise-and-interference ratios (SNRs) of the detected symbol streams. RX processor 1260 can then provide estimated channel characteristics to a processor 1270. In one example, RX processor 1260 and/or processor 1270 can further derive an estimate of the "operating" SNR for the system. Processor 1270 can then provide channel state information (CSI), which may comprise information regarding the communication link and/or the received data stream. This information may include, for example, the operating SNR. The CSI can then be processed by a TX data processor 1278, modulated by a modulator 1280, conditioned by transmitters 1254a through 1254r, and transmitted back to transmitter system 1210.

Back at transmitter system 1210, the modulated signals from receiver system 1250 can then be received by antennas 1224, conditioned by receivers 1222, demodulated by a demodulator 1240, and processed by a RX data processor 1242 to recover the CSI reported by receiver system 1250. In one example, the reported CSI can then be provided to processor 1230 and used to determine data rates as well as coding and modulation schemes to be used for one or more data streams. The determined coding and modulation schemes can then be provided to transmitters 1222 for quantization and/or use in later transmissions to receiver system 1250. Additionally and/or alternatively, the reported CSI can be used by processor 1230 to generate various controls for TX data processor 1214 and TX MIMO processor 1220.

In one example, processor 1230 at transmitter system 1210 and processor 1270 at receiver system 1250 direct operation at their respective systems. Additionally, memory 1232 at transmitter system 1210 and memory 1272 at receiver system 1250 can provide storage for program codes and data used by processors 1230 and 1270, respectively. Further, at receiver system 1250, various processing techniques may be used to process the $N_R$ received signals to detect the $N_T$ transmitted symbol streams. These receiver processing techniques can include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 13:
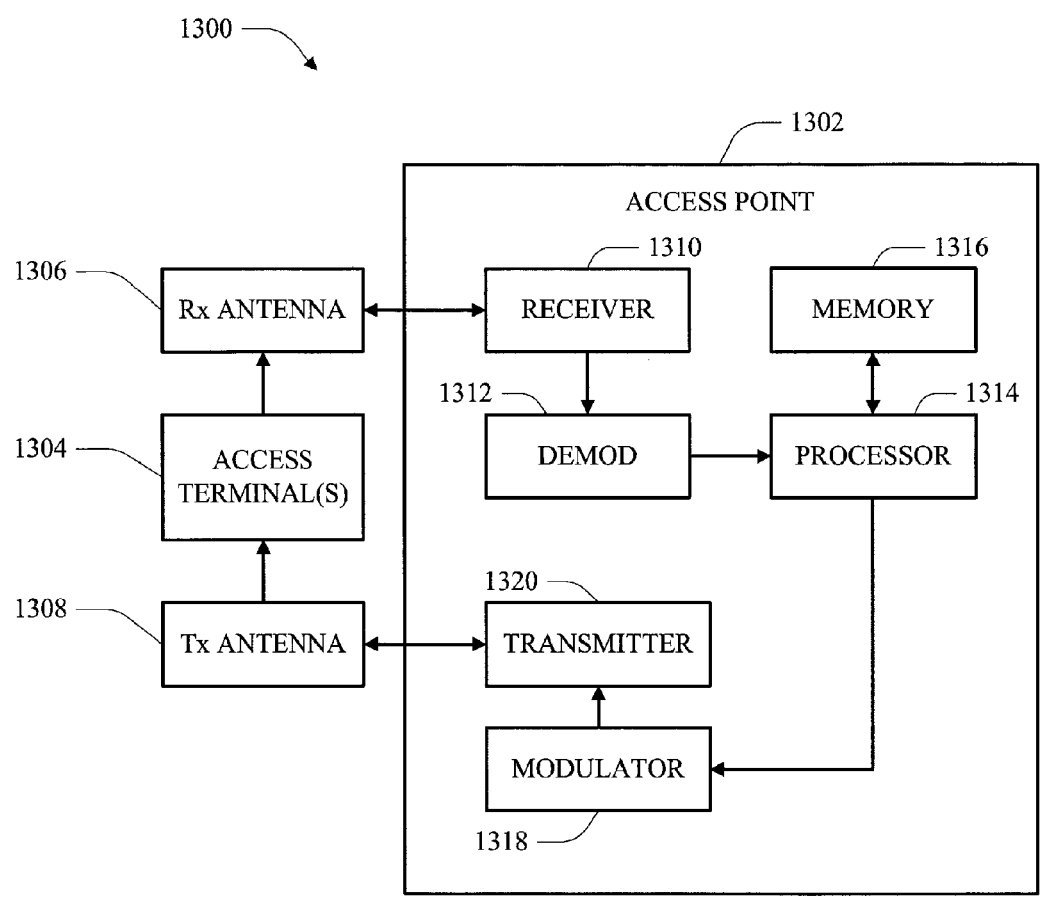
FIG. 13 is a block diagram of a system that coordinates generation and transmission of acquisition information in accordance with various aspects.

FIG. 13 is a block diagram of a system 1300 that coordinates generation and transmission of acquisition information in accordance with various aspects described herein. In one example, system 1300 includes a base station or access point 1302. As illustrated, access point 1302 can receive signal(s) from one or more access terminals 1304 via a receive (Rx) antenna 1306 and transmit to the one or more access terminals 1304 via a transmit (Tx) antenna 1308.

Additionally, access point 1302 can comprise a receiver 1310 that receives information from receive antenna 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. In one example, access point 1302 can employ processor 1314 to perform methodologies 600, 700, 800, and/or other appropriate methodologies. Access point 1302 can also include a modulator 1318 that can multiplex a signal for transmission by a transmitter 1320 through transmit antenna 1308 to one or more access terminals 1304.

Figure 14:
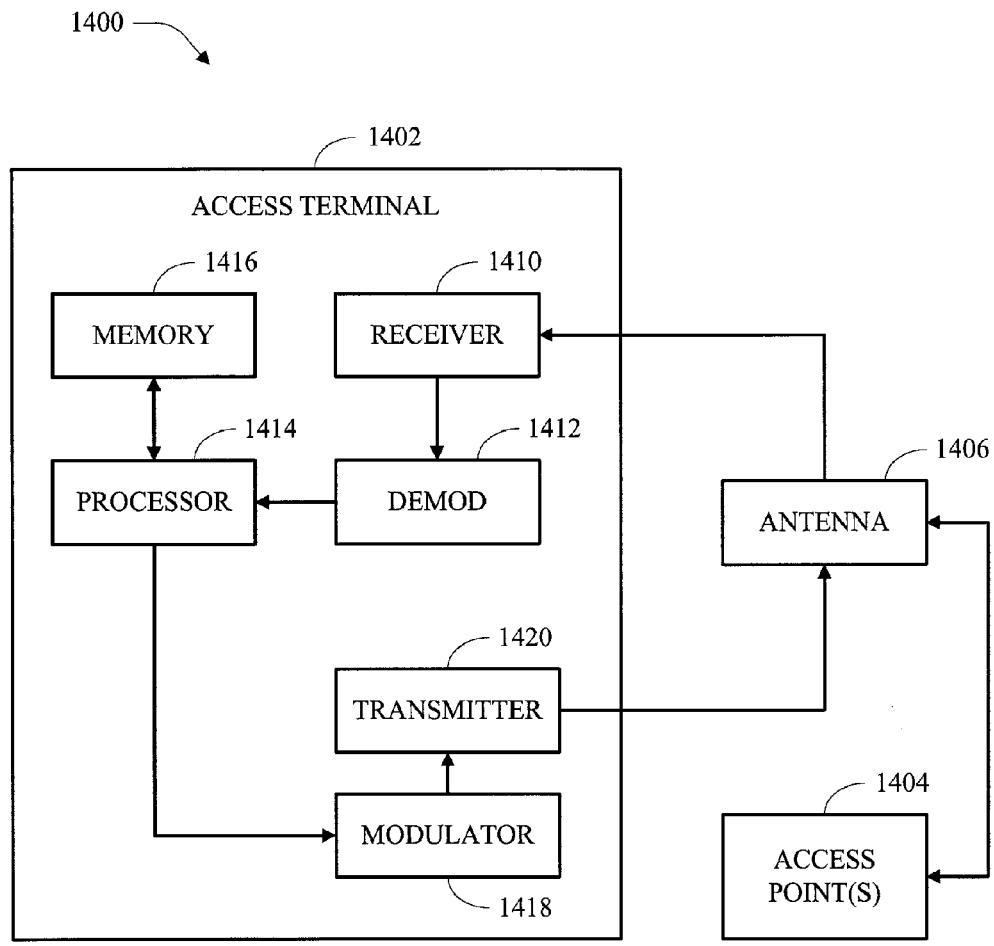
FIG. 14 is a block diagram of a system that coordinates signal acquisition in a wireless communication environment in accordance with various aspects.

FIG. 14 is a block diagram of a system 1400 that coordinates signal acquisition in a wireless communication environment in accordance with various aspects described herein. In one example, system 1400 includes an access terminal 1402. As illustrated, access terminal 1402 can receive signal(s) from one or more access points 1404 and transmit to the one or more access points 1404 via an antenna 1408. Additionally, access terminal 1402 can comprise a receiver 1410 that receives information from antenna 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to access terminal 1402. Additionally, access terminal 1402 can employ processor 1414 to perform methodologies 900, 1000, 1100, and/or other appropriate methodologies. Access terminal 1402 can also include a modulator 1418 that can multiplex a signal for transmission by a transmitter 1420 via antenna 1408 to one or more access points 1404.

Figure 15:
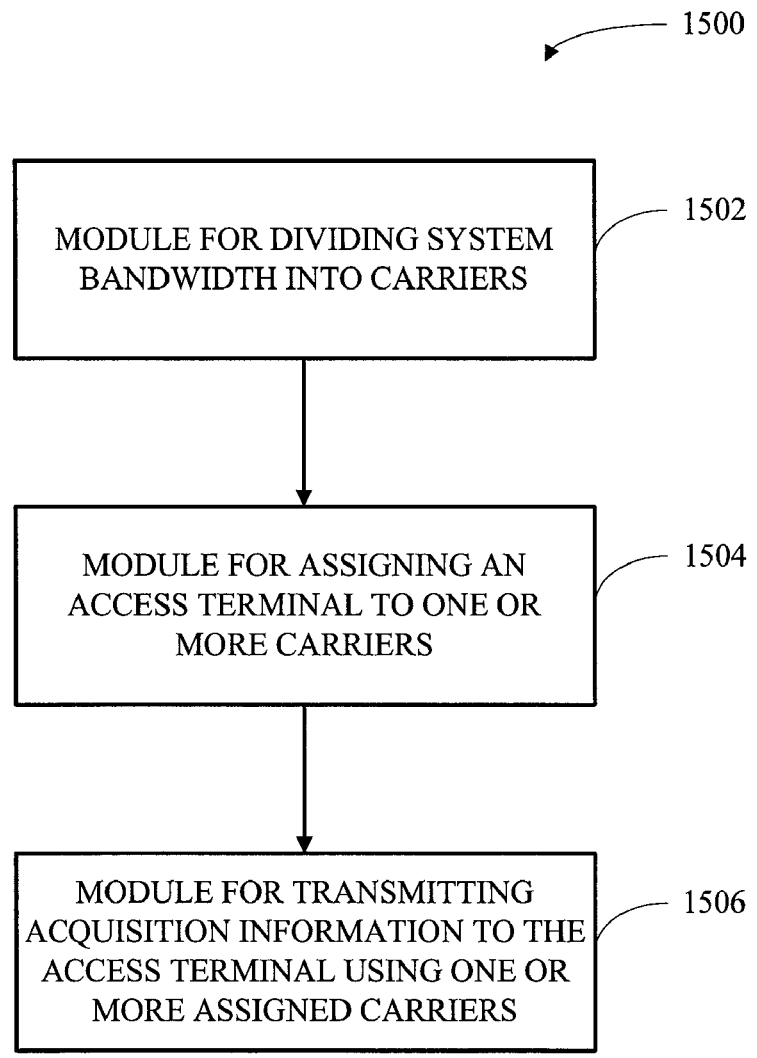
FIG. 15 is a block diagram of an apparatus that facilitates the transmission of acquisition information in a wireless communication system in accordance with various aspects.

FIG. 15 illustrates an apparatus 1500 that facilitates the transmission of acquisition information in a wireless communication system (e.g., system 200). It is to be appreciated that apparatus 1500 is represented as including functional blocks, which can be functional blocks that represent functions implemented by a processor, software, or combination thereof (e.g., firmware). Apparatus 1500 can be implemented in conjunction with an access point (e.g., access point 210) and can include a module for dividing system bandwidth (e.g., bandwidth 400) into a plurality of carriers (e.g., carriers 402) 1502. In one example, apparatus 1500 can further include a module for assigning an access terminal (e.g., an access terminal 220) to one or more carriers 1502 and a module for transmitting acquisition information to the access terminal using one or more assigned carriers 1506.

Figure 16:
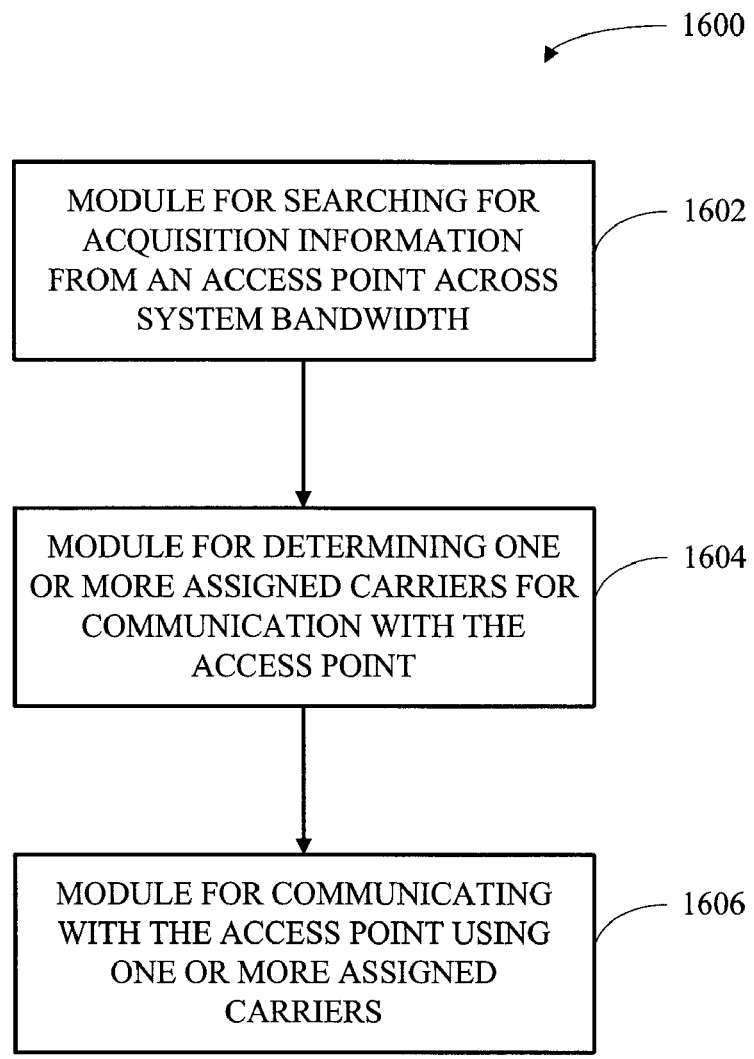
FIG. 16 is a block diagram of an apparatus that facilitates communication in a wireless communication system in accordance with various aspects.

FIG. 16 illustrates an apparatus 1600 that facilitates communication in a wireless communication system (e.g., system 200). It is to be appreciated that apparatus 1600 is represented as including functional blocks, which can be functional blocks that represent functions implemented by a processor, software, or combination thereof (e.g., firmware). Apparatus 1600 can be implemented in conjunction with an access terminal (e.g., an access terminal 220) and can include a module for searching for acquisition information from an access point (e.g., an access point 210) across system bandwidth (e.g., bandwidth 400). In one example, apparatus 1600 may further include a module for determining one or more assigned carriers (e.g., carriers 402) for communication with the access point 1604 and a module for communicating with the access point using one or more assigned carriers 1606.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for wireless communication, comprising:
generating a plurality of symbols for an acquisition signal;
transmitting the acquisition signal on a first set of consecutive carriers corresponding to a first bandwidth; and
transmitting a pilot on each of a second set of carriers corresponding to a second bandwidth, wherein the first bandwidth is less than the second bandwidth and each of the carriers in the first and second sets of carriers are of equal bandwidth.

2. The method of claim 1, wherein the second set of carriers comprises at least the first set of carriers, and the second bandwidth corresponds to an available bandwidth in the wireless communication system and comprises at least the first bandwidth.

3. The method of claim 1, wherein the second bandwidth comprises substantially all available bandwidth in the wireless communication system.

4. The method of claim 1, wherein the second bandwidth comprises substantially all available bandwidth in a sector of the wireless communication system.

5. The method of claim 1, wherein each of the carriers in the first and second sets of carriers comprises a bandwidth of 5 MHz.

6. The method of claim 1, wherein each of the carriers in the first and second sets of carriers comprises a bandwidth of 2.5 MHz.

7. The method of claim 1, wherein each of the carriers in the first and second sets of carriers comprises a bandwidth of 1.25 MHz.

8. The method of claim 1, wherein the second set of carriers includes seven utilized carriers and one non-utilized carrier, and wherein the first set of carriers is a subset of the seven utilized carriers according to a predetermined frequency re-use plan for the seven utilized carriers.

9. The method of claim 1, wherein the second set of carriers includes seven carriers, and wherein first set of carriers is a subset of the seven carriers according to a predetermined frequency re-use plan for the seven carriers.

10. The method of claim 1, wherein the acquisition signal includes information relating to at least one broadcast channel.

11. The method of claim 1, wherein the transmitting the acquisition signal includes transmitting the acquisition signal based at least in part on a hop sequence.

12. The method of claim 1, wherein the transmitting the acquisition signal comprises transmitting the acquisition signal to an access terminal.

13. The method of claim 1, wherein the transmitting the acquisition signal includes transmitting the acquisition signal in a superframe preamble.

14. The method of claim 1, further comprising:
scheduling an access terminal on one or more carriers among the second set of carriers; and
communicating with the access terminal using the one or more carriers.

15. The method of claim 14, wherein the scheduling the access terminal on one or more carriers includes:
receiving an access request from the access terminal;
scheduling the access terminal on the one or more carriers based at least in part on the access request; and
transmitting an assignment for the one or more carriers to the access terminal.

16. The method of claim 15, wherein the access request received from the access terminal includes an indication of whether the access terminal is capable of communicating on more than one carrier.

17. The method of claim 1, further comprising:
transmitting control information for each carrier of the second set of carriers on said each carrier.

18. The method of claim 1, further comprising:
transmitting control information for the second set of carriers on a designated carrier among the plurality of carriers.

19. The method of claim 18, further comprising:
receiving uplink control information sent by an access terminal on the designated carrier or another one of the second set of carriers.

20. The method of claim 1, further comprising:
transmitting control information for each carrier of the second set of carriers on at least one control channel for said each carrier.

21. The method of claim 1, wherein the control information for each carrier of the second set of carriers comprises scheduling information, or power control information, or both.

22. A method of wireless communication, comprising:
generating a plurality of symbols of an acquisition signal;
transmitting the acquisition signal on a subset of a plurality of carriers available for communication, each carrier comprising a plurality of subcarriers;
receiving an indication of whether an access terminal is capable of communicating on more than one carrier;
scheduling the access terminal on one carrier among the plurality of carriers if the indication is negative and on at least two carriers among the plurality of carriers if the indication is positive;
transmitting an assignment for the one carrier or the at least two carriers to the access terminal; and
communicating with the access terminal using the one carrier or the at least two carriers.

23. A method of wireless communication, comprising:
generating a plurality of symbols of an acquisition signal;
transmitting the acquisition signal on a subset of a plurality of carriers available for communication, each carrier comprising a plurality of subcarriers;
scheduling an access terminal on a first set of one or more carriers among the plurality of carriers;
communicating with the access terminal using the first set of one or more carriers;
scheduling the access terminal on a second set of one or more carriers;
transmitting a change carrier message to the access terminal including an assignment for the second set of one or more carriers; and
communicating with the access terminal using the second set of one or more carriers.

24. A wireless communications apparatus, comprising:
a memory that stores data relating to an acquisition signal and a plurality of carriers available for communication; and
a processor configured to transmit the acquisition signal on a first set of consecutive carriers corresponding to a first bandwidth on downlink, and to transmit a pilot on each of a second set of carriers corresponding to a second bandwidth, wherein the first bandwidth is less than the second bandwidth and each of the carriers in the first and second sets of carriers are of equal bandwidth.

25. The wireless communications apparatus of claim 24, wherein the memory further stores data relating to an identification code, and wherein the processor is further configured to send the acquisition signal based at least in part on a function of the identification code.

26. The wireless communications apparatus of claim 25, wherein the identification code is a pseudo-noise (PN) sequence.

27. The wireless communications apparatus of claim 25, wherein the identification code is a Walsh sequence.

28. An apparatus for wireless communication, comprising:
means for determining a plurality of carriers available for communication;
means for transmitting an acquisition signal on a first set of consecutive carriers corresponding to a first bandwidth on downlink; and
means for transmitting a pilot on each of a second set of carriers corresponding to a second bandwidth, wherein the first bandwidth is less than the second bandwidth and each of the carriers in the first and second sets of carriers are of equal bandwidth.

29. The apparatus of claim 28, wherein the acquisition signal includes information relating to at least one broadcast channel.

30. The apparatus of claim 28, wherein the means for transmitting the acquisition signal includes means for transmitting the acquisition signal based at least in part on a hop sequence.

31. A non-transitory computer-readable medium having stored thereon computer-executable instructions for wireless communication, the instructions comprising:
determining a plurality of carriers available for communication;
generating a plurality of symbols for an acquisition signal;
transmitting the acquisition signal on a first set of consecutive carriers corresponding to a first bandwidth on downlink; and
transmitting a pilot on each of a second set of carriers corresponding to a second bandwidth, wherein the first bandwidth is less than the second bandwidth and each of the carriers in the first and second sets of carriers are of equal bandwidth.

32. The non-transitory computer-readable medium of claim 31, wherein the generating a plurality of symbols includes generating the plurality of symbols comprising acquisition information, or interference information, or both.

33. A processor that executes computer-executable instructions for wireless communication, the instructions comprising:
generating a first acquisition signal and a second acquisition signal;
transmitting the first acquisition signal on downlink to a first access terminal on a first set consecutive carriers corresponding to a first portion of available system bandwidth;
transmitting the second acquisition signal on the downlink to a second access terminal on a second set consecutive carriers corresponding a second portion of the available system bandwidth; and
transmitting a pilot on each of a third set of carriers corresponding to the available system bandwidth, wherein each of the carriers in the first, second, and third sets of carriers are of equal bandwidth.

34. The processor of claim 33, further comprising:
receiving a first access request from the first access terminal and a second access request from the second access terminal;
assigning the first access terminal to a carrier based at least in part on the first access request; and
assigning the second access terminal to at least two carriers based at least in part on the second access request.

35. A processor that executes computer-executable instructions for wireless communication, the instructions comprising:
generating a plurality of symbols of an acquisition signal;
transmitting the acquisition signal on a subset of a plurality of carriers available for communication, each carrier comprising a plurality of subcarriers;

assigning a first access terminal to a carrier among the plurality of carriers based on information indicating that the first access terminal cannot communicate on multiple carriers, and assigning a second access terminal to at least two carriers among the plurality of carriers based on information indicating that the second access terminal can communicate on multiple carriers.

36. A method implemented in an apparatus for wireless communication, comprising:

detecting, via the apparatus, an acquisition signal transmitted on a first set consecutive carriers corresponding to a first bandwidth on downlink; and detecting, via the apparatus, a pilot transmitted on each of a second set of carriers corresponding to a second bandwidth, wherein the first bandwidth is less than the second bandwidth and each of the carriers in the first and second sets of carriers are of equal bandwidth.

37. The method of claim 36, wherein each of the carriers in the first and second sets of carriers comprises a bandwidth of 5 MHz.

38. The method of claim 36, wherein each of the carriers in the first and second sets of carriers comprises a bandwidth of 2.5 MHz.

39. The method of claim 36, wherein each of the carriers in the first and second sets of carriers comprises a bandwidth of 1.25 MHz.

40. The method of claim 36, further comprising:

determining, via the apparatus, a future carrier on which information will be communicated by an access point based at least in part on the acquisition signal.

41. The method of claim 36, further comprising:

receiving control information for each of at least one carrier on said each carrier.

42. The method of claim 36, further comprising:

receiving control information for at least one carrier on a designated carrier among the second set of carriers.

43. The method of claim 36, further comprising:

transmitting uplink control information on the designated carrier or another one of the second set of carriers.

44. The method of claim 36, further comprising:

receiving control information for each of at least one carrier on at least one control channel for said each carrier.

45. The method of claim 36, wherein control information for each carrier of the second set of carriers comprises scheduling information, or power control information, or both.

46. A wireless communications apparatus, comprising:

a memory that stores data relating to a plurality of carriers available for communication; and a processor configured to detect an acquisition signal transmitted on downlink on a first set of consecutive carriers corresponding to a first bandwidth, and to detect a pilot transmitted on each of a second set of carriers corresponding to a second bandwidth, wherein the first bandwidth is less than the second bandwidth and each of the carriers in the first and second sets of carriers are of equal bandwidth.

47. The wireless communications apparatus of claim 46, wherein the processor is further configured to determine a future carrier on which information will be communicated by an access point based at least in part on the acquisition signal.

48. The wireless communications apparatus of claim 47, wherein the acquisition signal includes an identifier for the sector.

49. The wireless communications apparatus of claim 48, wherein the identifier for the sector is a pseudo-noise (PN) sequence.

50. The wireless communications apparatus of claim 48, wherein the identifier for the sector is a Walsh sequence.

51. An apparatus for wireless communication, comprising:

means for detecting an acquisition signal transmitted on a first set of consecutive carriers corresponding to a first bandwidth on downlink; and means for detecting a pilot transmitted on each of a second set of carriers corresponding to a second bandwidth, wherein the first bandwidth is less than the second bandwidth and each of the carriers in the first and second sets of carriers are of equal bandwidth.

52. A non-transitory computer-readable medium having stored thereon computer-executable instructions for wireless communication, the instructions comprising:

detecting an acquisition signal transmitted by an access point on a first set of consecutive carriers corresponding to a first bandwidth on downlink; and detecting a pilot transmitted on each of a second set of carriers corresponding to a second bandwidth, wherein the first bandwidth is less than the second bandwidth and each of the carriers in the first and second sets of carriers are of equal bandwidth.

53. A processor that executes computer-executable instructions for wireless communication, the instructions comprising:

receiving an acquisition signal transmitted from a sector of the wireless communication system on a first set of consecutive carriers corresponding to a first bandwidth; and receiving a pilot transmitted on each of a second set of carriers corresponding to a second bandwidth, wherein the first bandwidth is less than the second bandwidth and each of the carriers in the first and second sets of carriers are of equal bandwidth.

54. The processor of claim 53, the instructions further comprising:

transmitting an access request to the sector on one or more carriers determined for communication;

receiving an access grant and at least one newly assigned carrier for communication from the sector; and communicating with the sector using the at least one newly assigned carrier.

* * * * *